(12) United States Patent
Woog et al.

(10) Patent No.: US 10,691,470 B2
(45) Date of Patent: Jun. 23, 2020

(54) PERSONAL COMPUTER SYSTEM WITH REMOTELY-CONFIGURED HARDWARE-ENFORCED USAGE LIMITS

(71) Applicants: Kenneth Mark Woog, Lake Forest, CA (US); Timothy Michael Woog, Aliso Viejo, CA (US)

(72) Inventors: Kenneth Mark Woog, Lake Forest, CA (US); Timothy Michael Woog, Aliso Viejo, CA (US)

(*) Notice: Subject to any disclaimer, the term of this patent is extended or adjusted under 35 U.S.C. 154(b) by 116 days.

(21) Appl. No.: 15/186,341

(22) Filed: Jun. 17, 2016

(65) Prior Publication Data

US 2016/0371099 A1 Dec. 22, 2016

Related U.S. Application Data

(60) Provisional application No. 62/181,748, filed on Jun. 18, 2015.

(51) Int. Cl.
| | |
|---|---|
| *G06F 9/445* | (2018.01) |
| *H04L 29/06* | (2006.01) |
| *G06F 9/4401* | (2018.01) |
| *H04L 29/08* | (2006.01) |

(52) U.S. Cl.
CPC ........ *G06F 9/44505* (2013.01); *G06F 9/4406* (2013.01); *H04L 67/10* (2013.01); *H04L 67/22* (2013.01); *H04L 67/24* (2013.01); *H04L 69/28* (2013.01); *G06F 9/442* (2013.01)

(58) Field of Classification Search
CPC .................. G06F 21/34; G06F 21/604; G06F 2221/2137; G06F 12/1433; G06F 21/31; G06F 21/84; G06F 2211/1097; H01R 13/6397; H01R 29/00; H01R 31/06; A63F 13/10; H04L 63/10; Y10S 707/99939
See application file for complete search history.

(56) References Cited

U.S. PATENT DOCUMENTS

| | | | |
|---|---|---|---|
| 5,377,269 | A | 12/1994 | Heptig |
| 5,691,928 | A | 11/1997 | Okaya |
| 6,049,045 | A | 4/2000 | Becker |
| 6,108,785 | A | 8/2000 | Poisner |
| 6,480,097 | B1 | 11/2002 | Zinsky |

(Continued)

*Primary Examiner* — Jaweed A Abbaszadeh
*Assistant Examiner* — Brian J Corcoran

(57) ABSTRACT

A personal computer includes a motherboard, video graphics adapter, mod board, switching board and single board computer. The switching board includes a microcontroller and USB and video switching circuits. A networked server includes a limitations database. The mod board is connected to the front panel signals of the motherboard and the main switching board connects to the mod board, the single board computer and the video graphics adapter. Upon user input to a program running on the single board computer, the program makes a server request. Response data is sent to the microcontroller on the switching board and, if time is available, switches the USB keyboard to the motherboard, the video output to the video graphics adapter and signals the mod board to power on the motherboard. The program on the single board computer signals the switching board to switch back video, USB and motherboard power when allowed time expires.

15 Claims, 15 Drawing Sheets

Detailed Block Diagram of System

(56) References Cited

U.S. PATENT DOCUMENTS

| | | | | |
|---|---|---|---|---|
| 6,678,824 B1* | 1/2004 | Cannon | ............... | A63F 13/10 |
| | | | | 705/59 |
| 6,892,305 B1* | 5/2005 | Dayan | ............... | G06F 21/575 |
| | | | | 713/1 |
| 7,356,836 B2 | 4/2008 | Beilinson | | |
| 7,502,878 B1* | 3/2009 | Wright | ............... | G06F 13/4022 |
| | | | | 710/37 |
| 7,818,789 B2 | 10/2010 | Beilinson | | |
| 7,836,192 B2 | 11/2010 | Johnson | | |
| 8,793,364 B1* | 7/2014 | Barkelew | ............... | G06F 1/24 |
| | | | | 709/224 |
| 8,881,225 B1 | 11/2014 | Cayola | | |
| 2003/0189591 A1* | 10/2003 | Mo | ............... | G06F 21/34 |
| | | | | 715/738 |
| 2003/0191960 A1 | 10/2003 | Hung-yi | | |
| 2004/0160129 A1 | 8/2004 | Dahlberg | | |
| 2007/0074284 A1 | 3/2007 | Woog | | |
| 2008/0079536 A1* | 4/2008 | Palfi | ............... | G04G 15/006 |
| | | | | 340/5.42 |
| 2014/0331314 A1* | 11/2014 | Fujioka | ............... | G06F 21/6218 |
| | | | | 726/17 |
| 2016/0078846 A1* | 3/2016 | Liu | ............... | G09G 5/18 |
| | | | | 345/212 |

\* cited by examiner

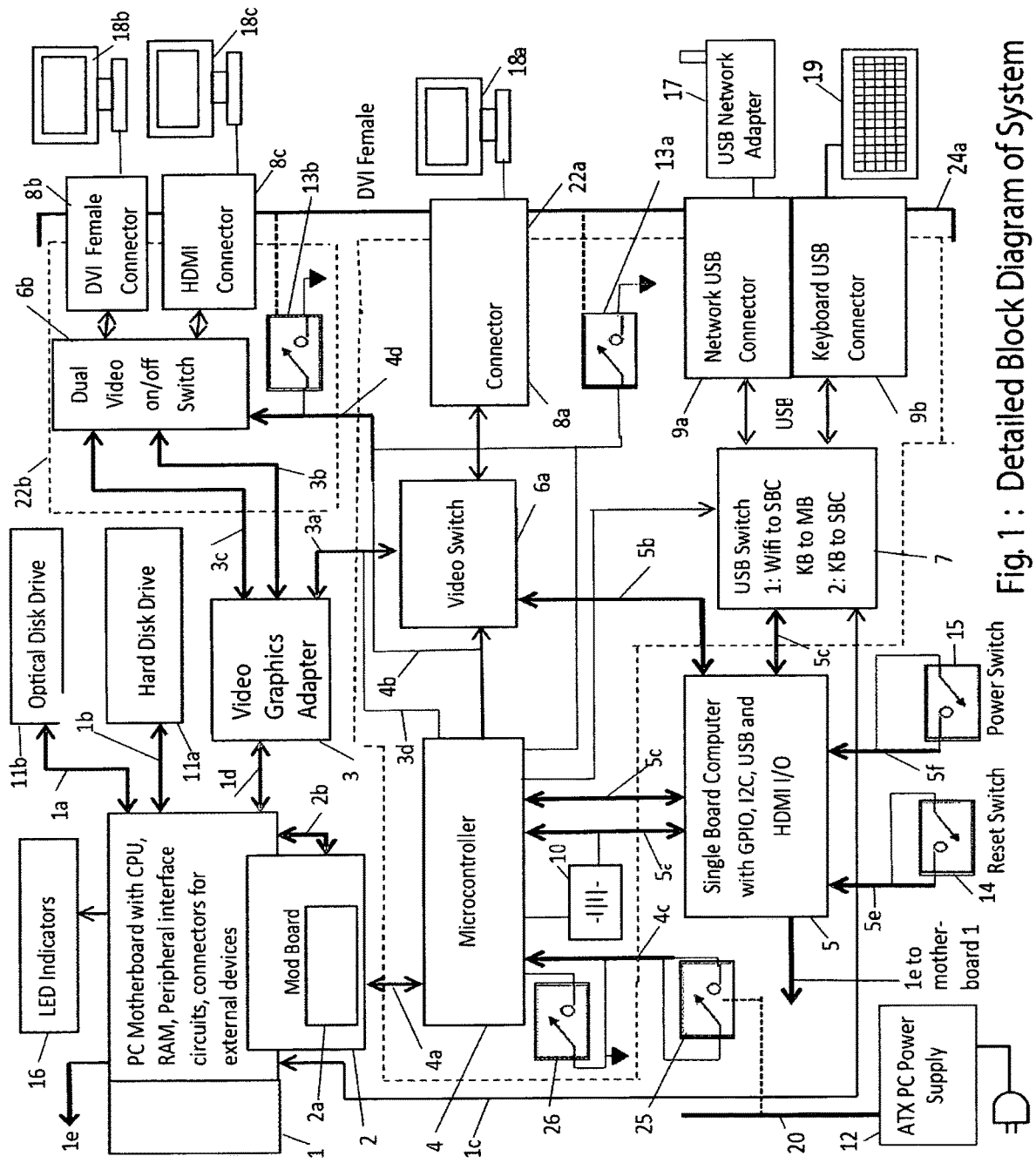
Fig. 1 : Detailed Block Diagram of System

Fig. 2: Mod Board 2 placement on solder side of Motherboard 1
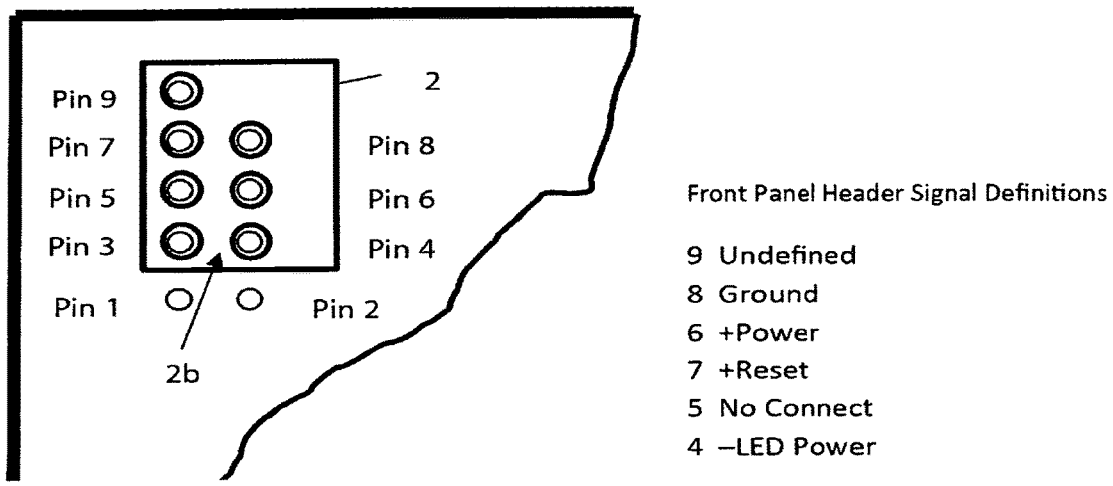
Front Panel Header Signal Definitions
9 Undefined
8 Ground
6 +Power
7 +Reset
5 No Connect
4 −LED Power
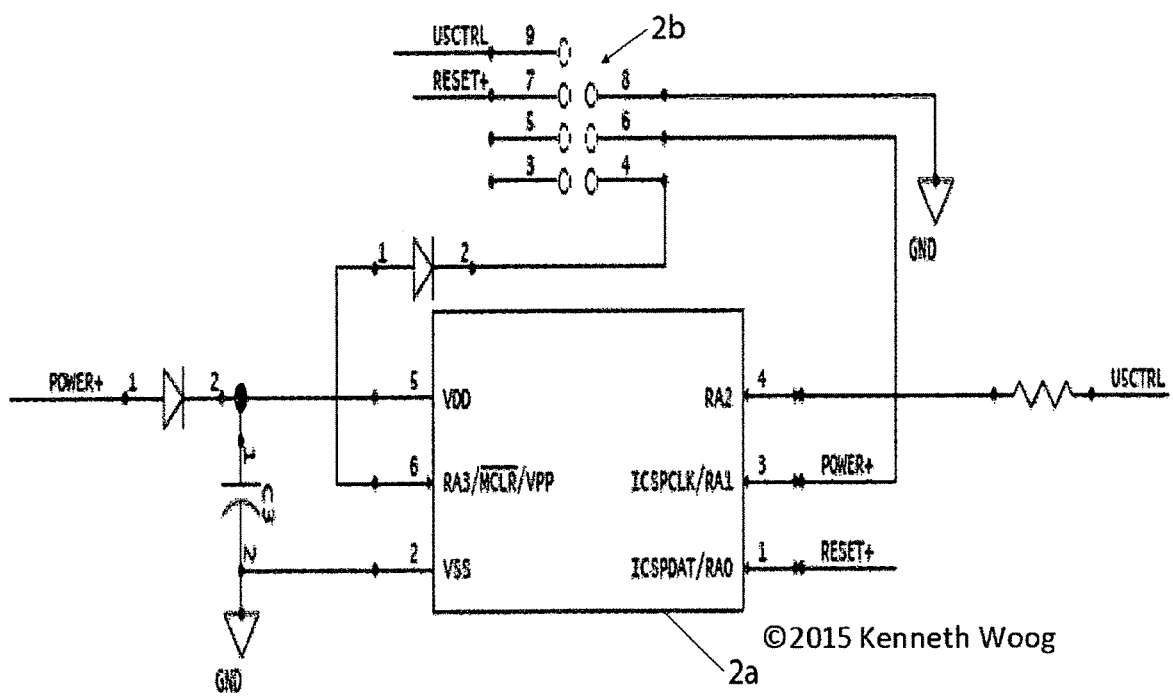
©2015 Kenneth Woog
Fig. 3 : Schematic Diagram of Mod Board 2

Fig. 4 : Computer System Enclosure
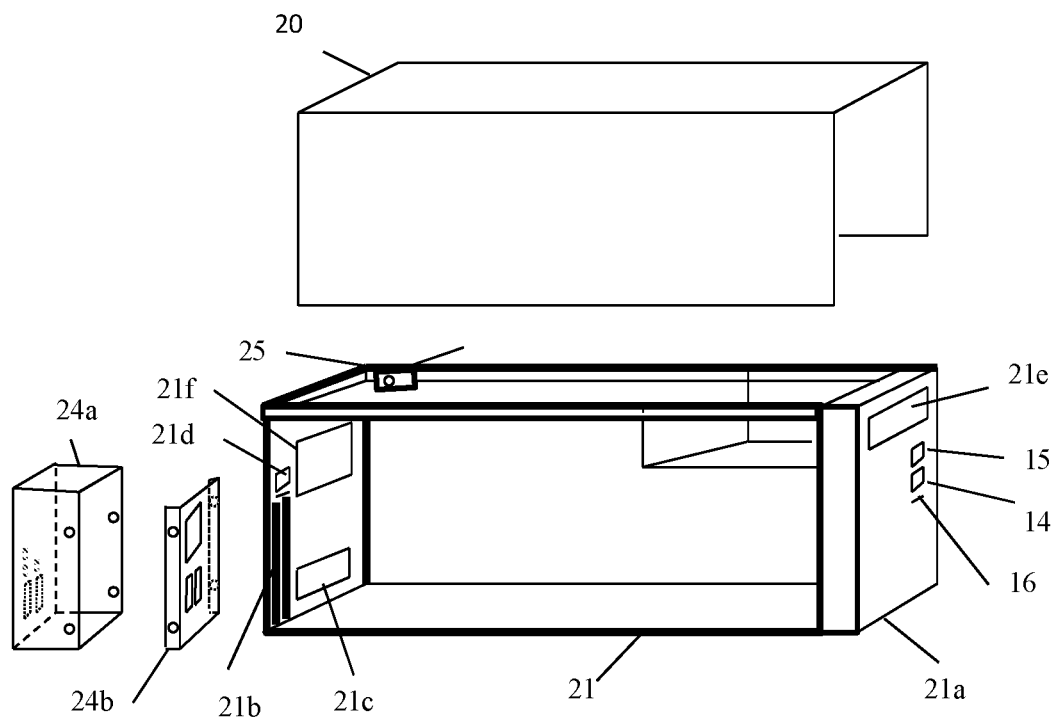

Fig. 5 : Exploded Side View of Mating of Main Switching Board 22a with Video Graphics Adapter 3 and Switching Board Cover Base 24b and Switching Board Cover Lid 24a
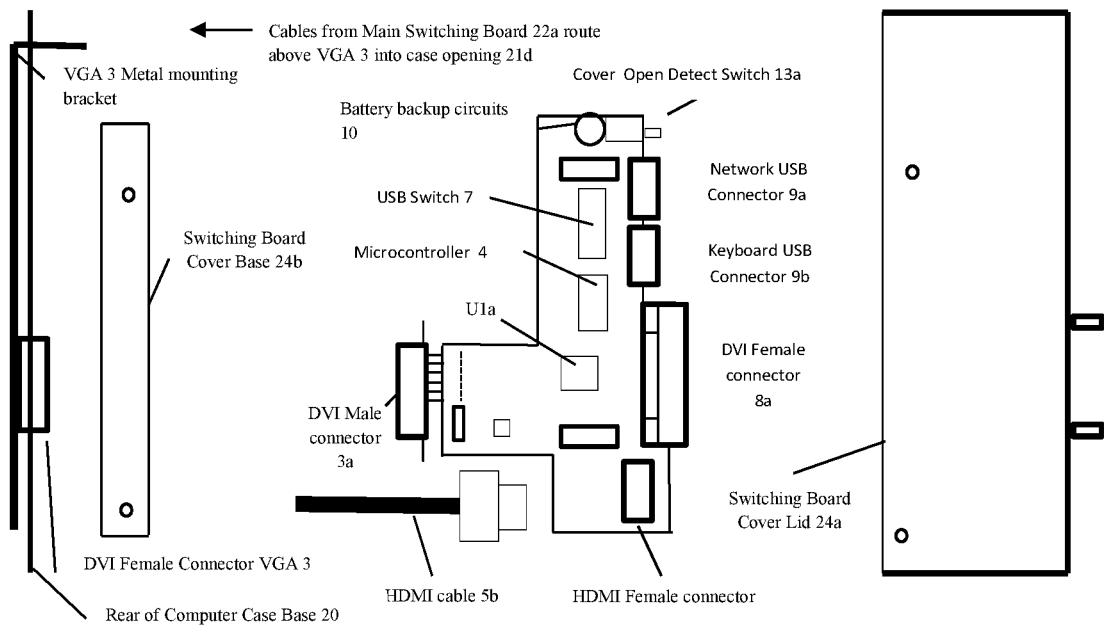
©2015 Kenneth Woog Fig. 6-a : Microsoft Windows OS Overview Diagram with installed Drivers and Applications
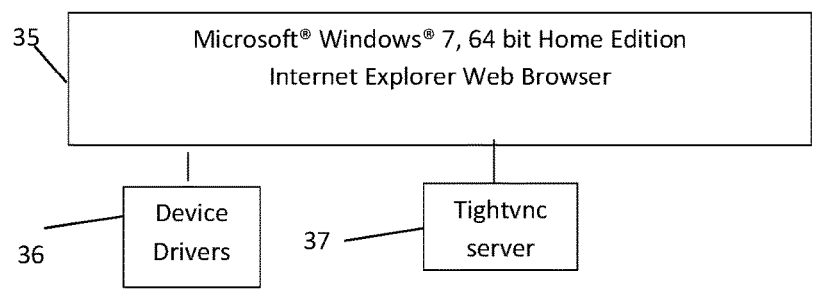
Fig. 6-b : Linux OS Overview Diagram with installed Libraries and Applications
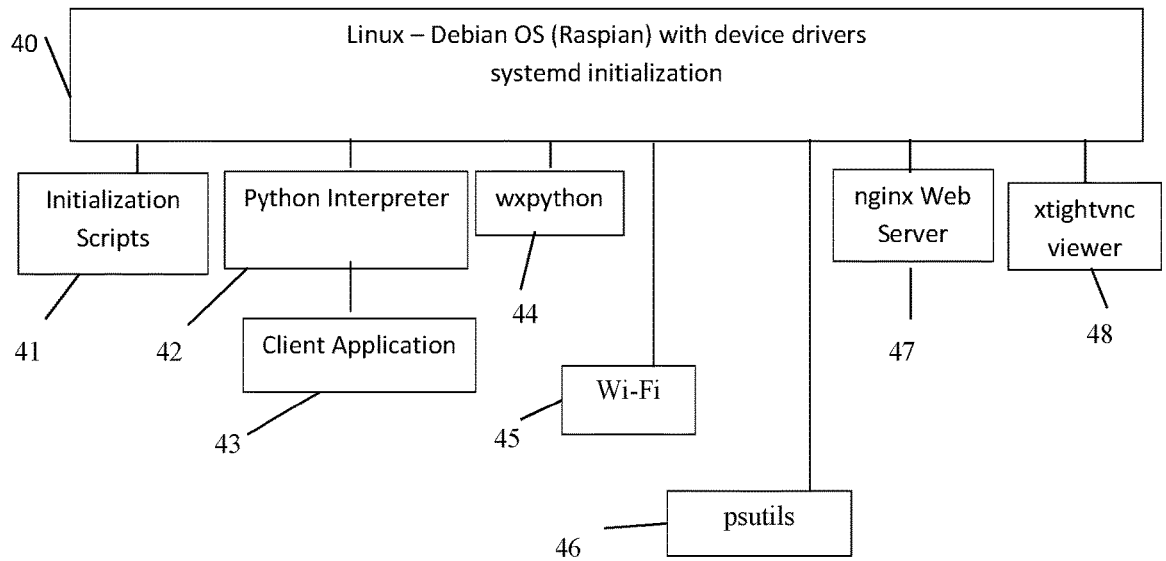

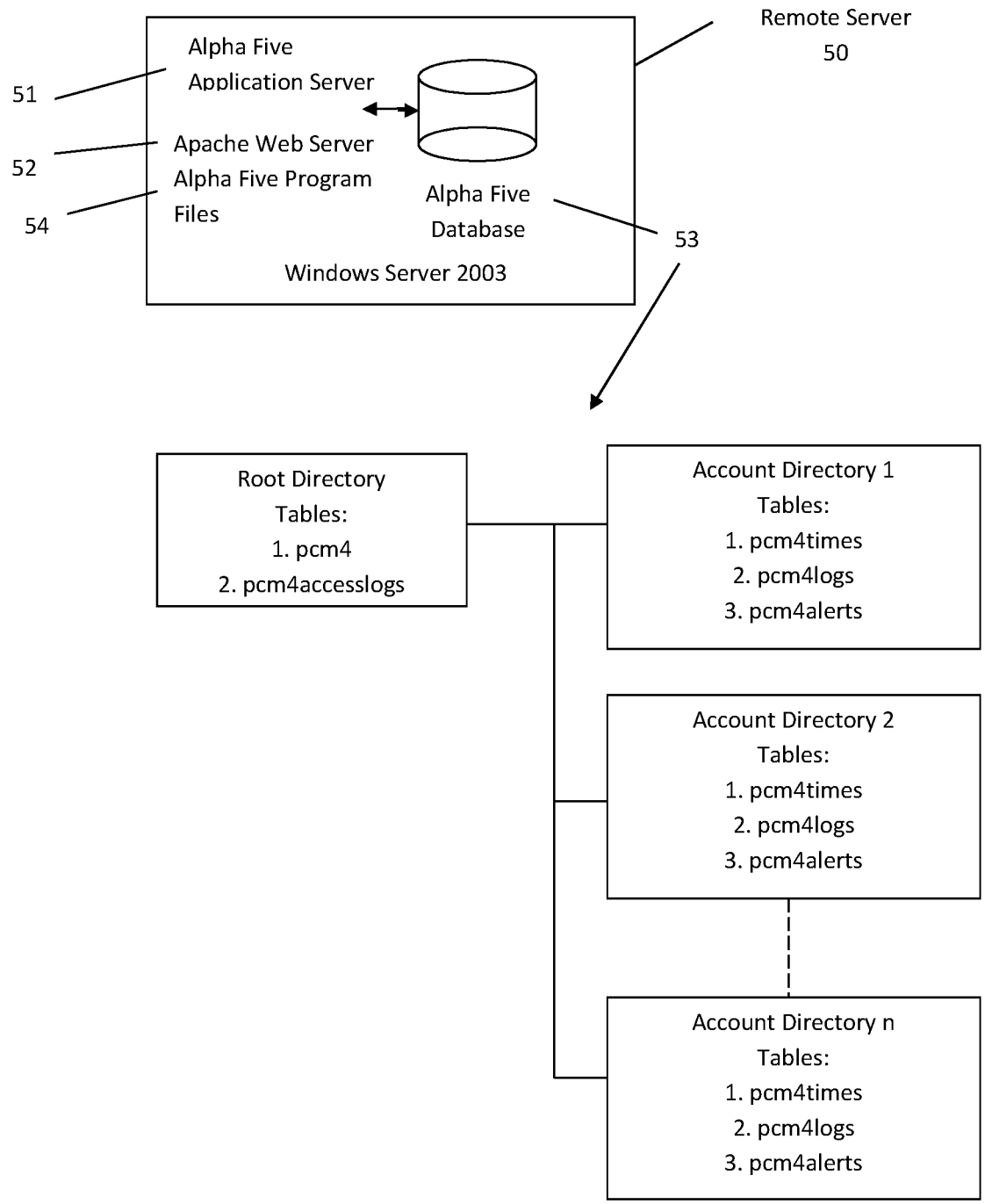
Fig. 6-c : Remote Server Program Outline

Fig. 7 : Alpha Five Program Remote Configuration Web Site Page Organization/Flowchart
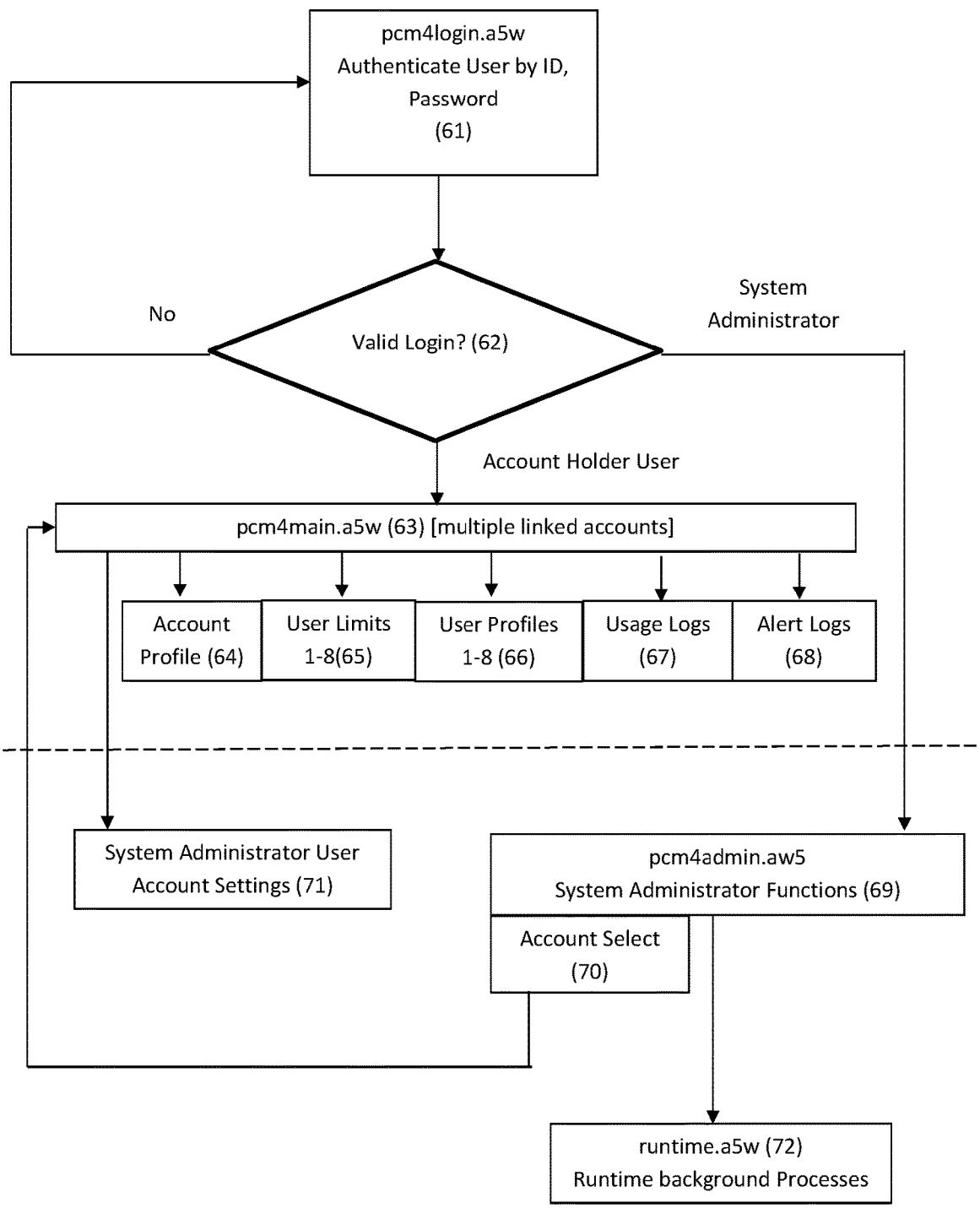

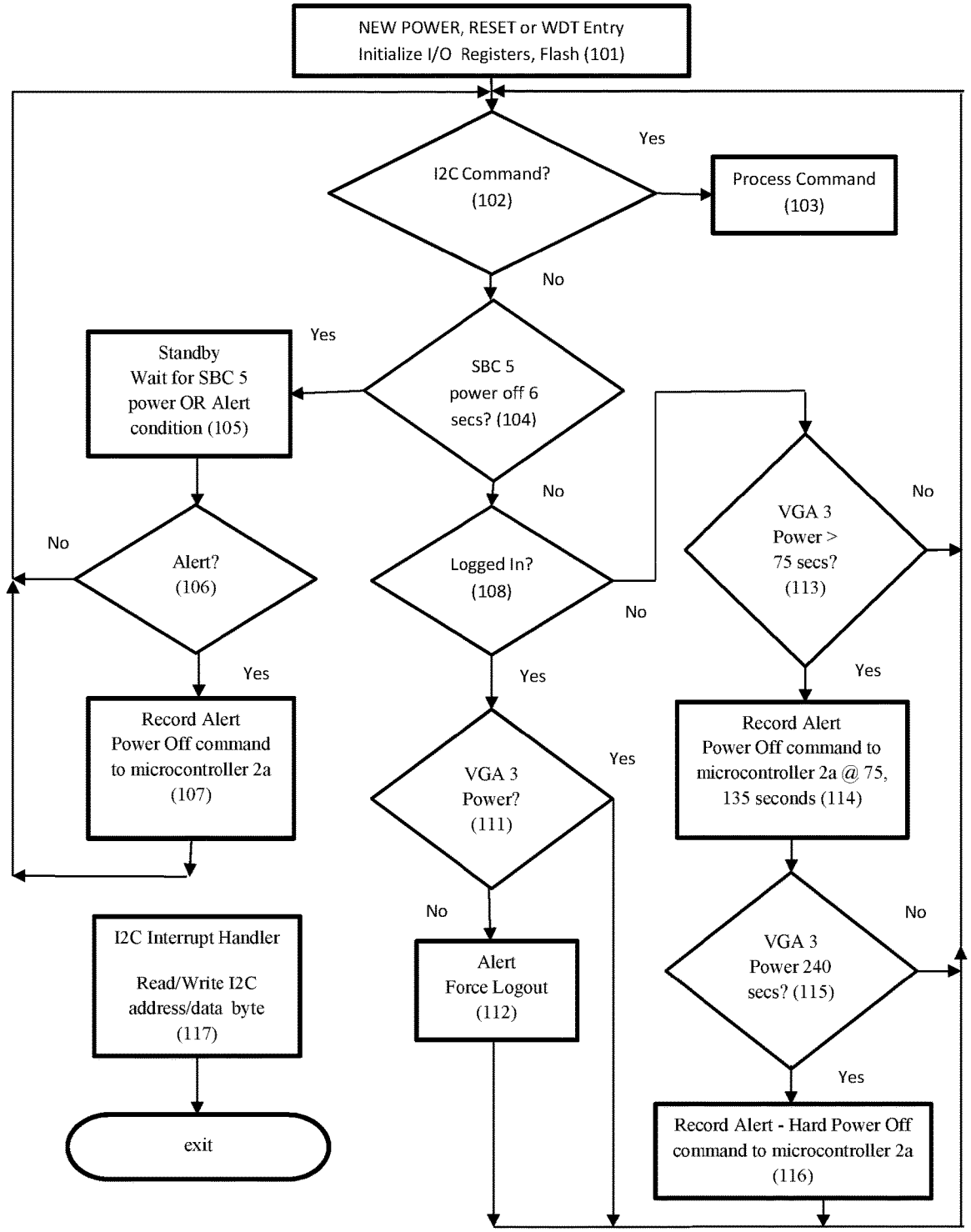

Fig. 9 : PIC10LF32 Microcontroller 2a Software Operation Flowchart
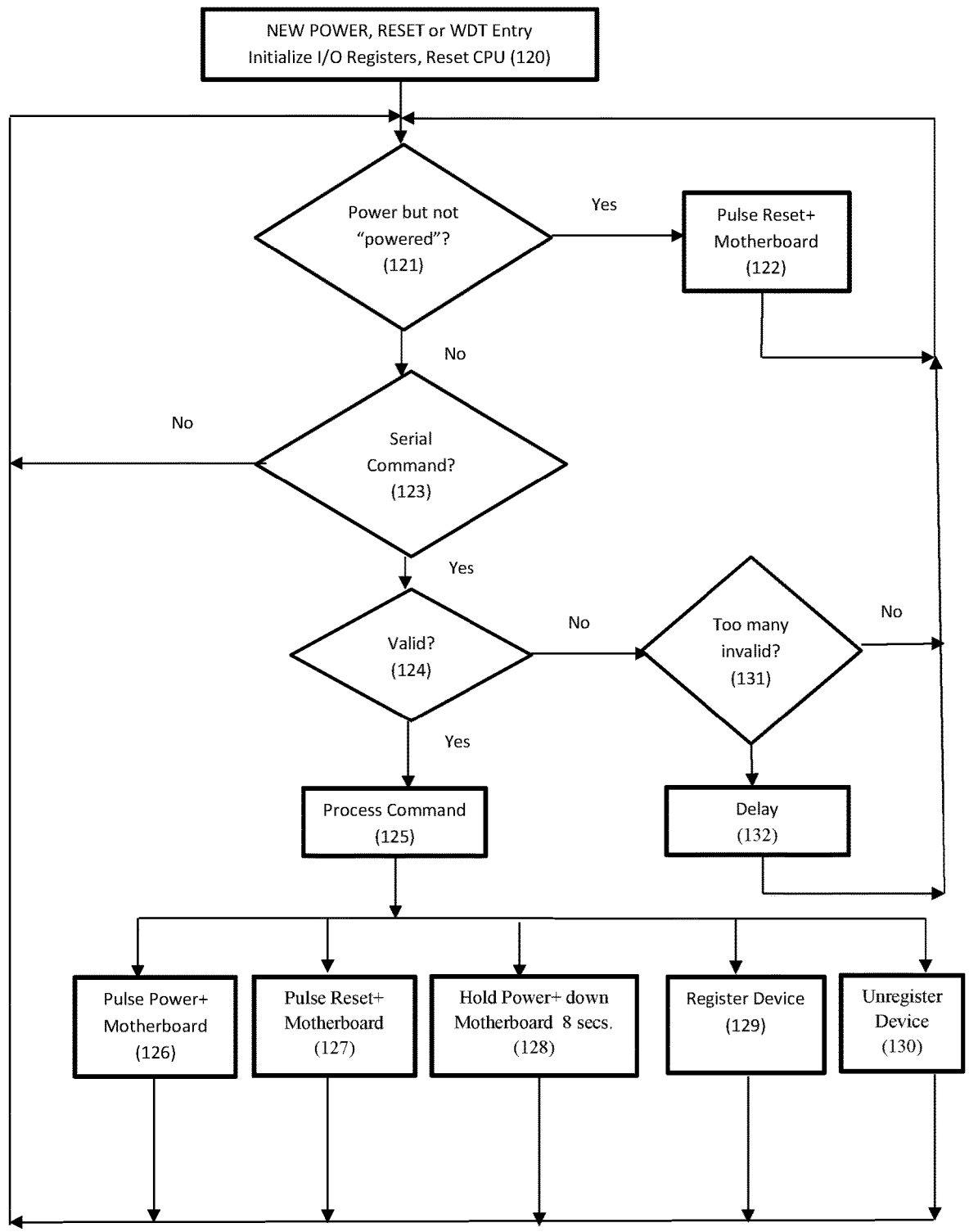

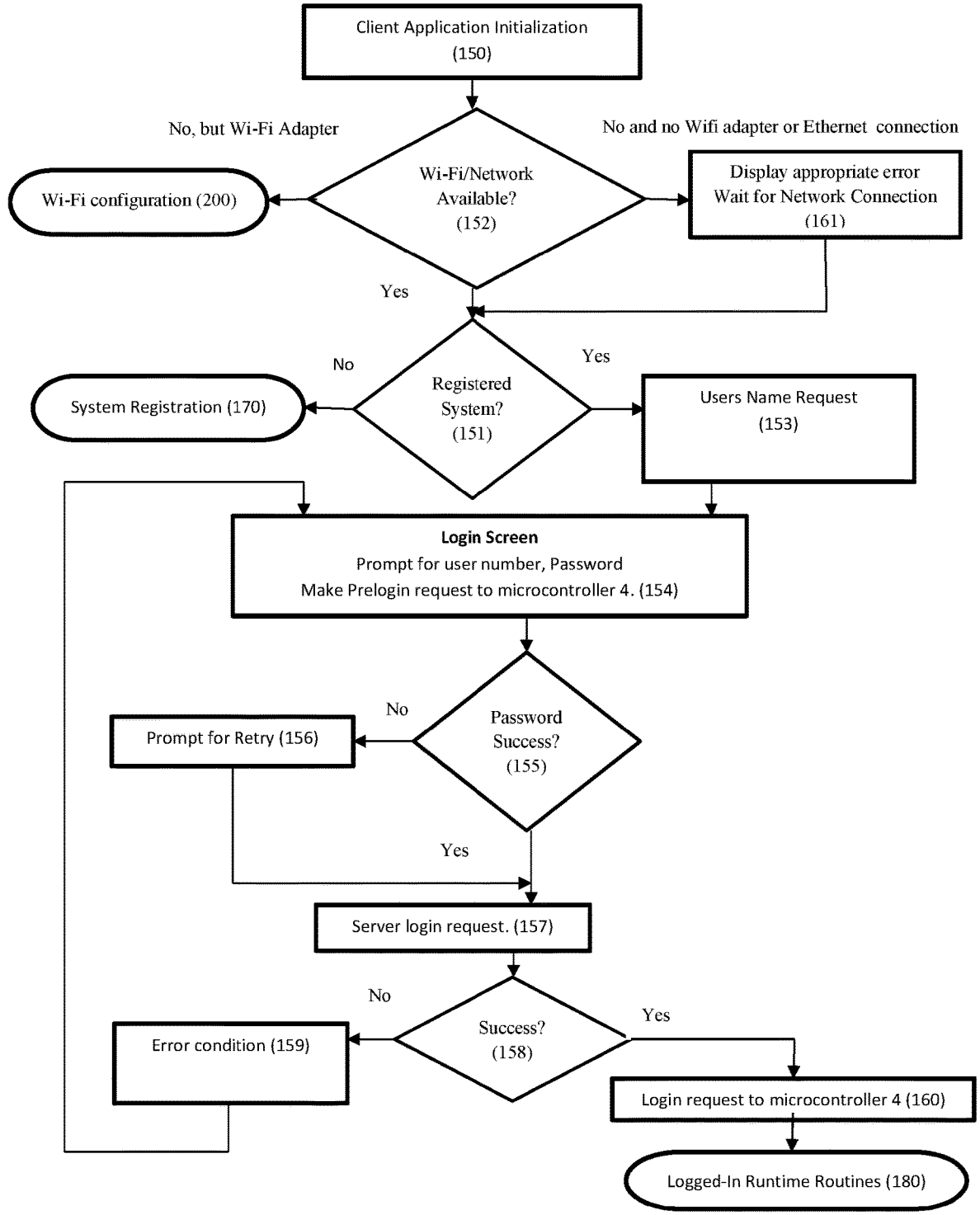

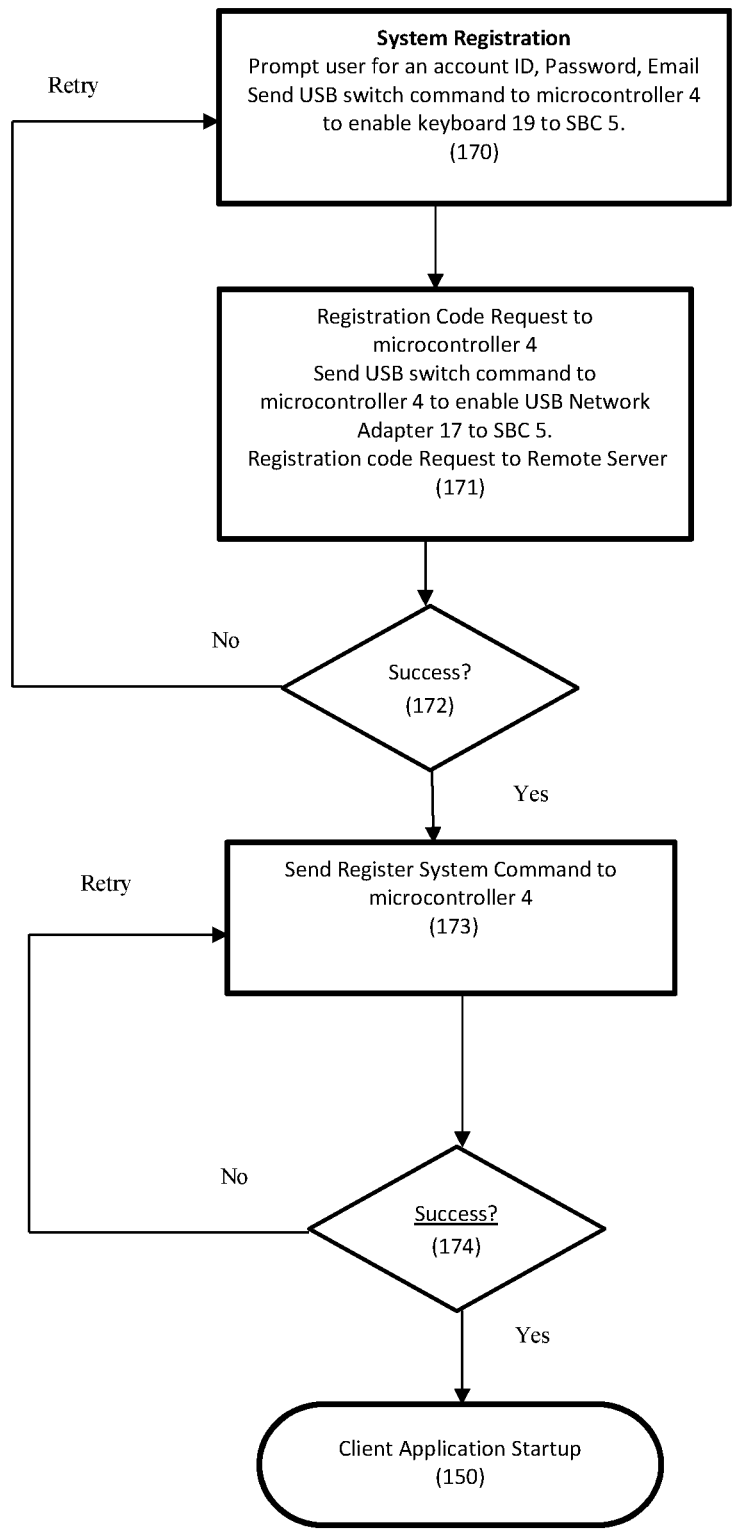
Fig. 11: SBC 5 Client Application System Registration Flowchart

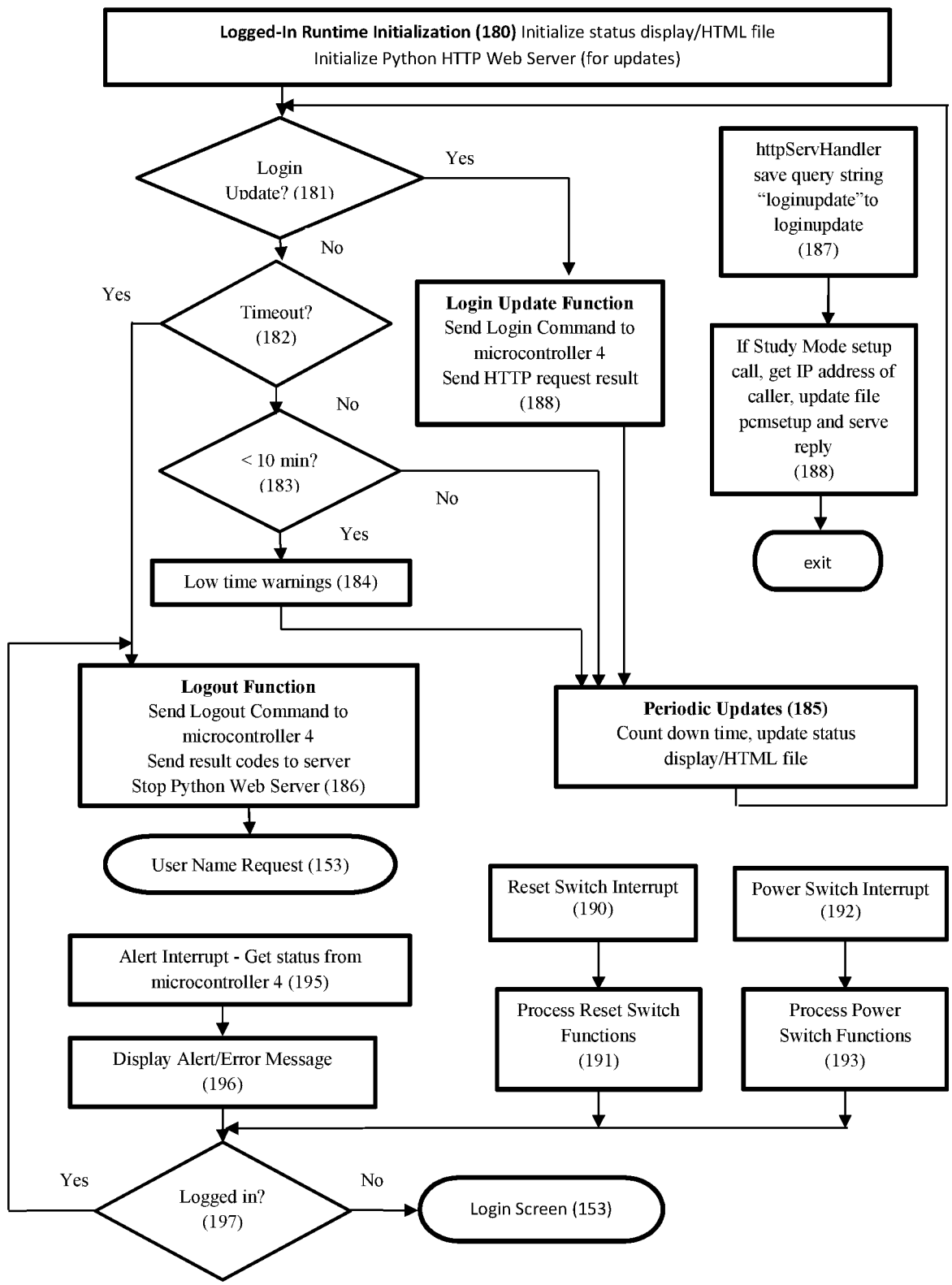
Fig. 12: SBC 5 Client Application Logged-in Flowchart

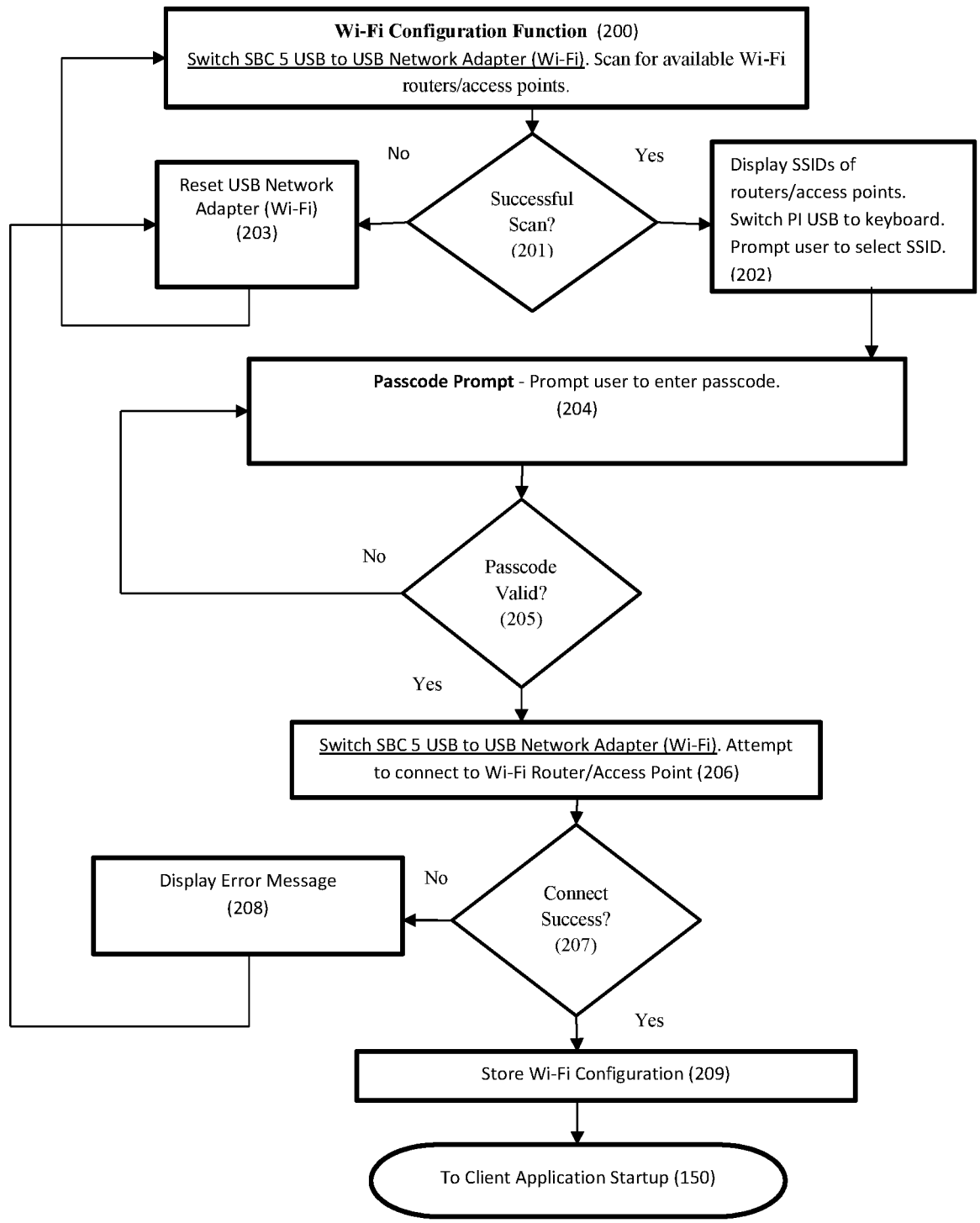
Fig. 13: SBC 5 Client Application Wi-Fi Configuration Flowchart

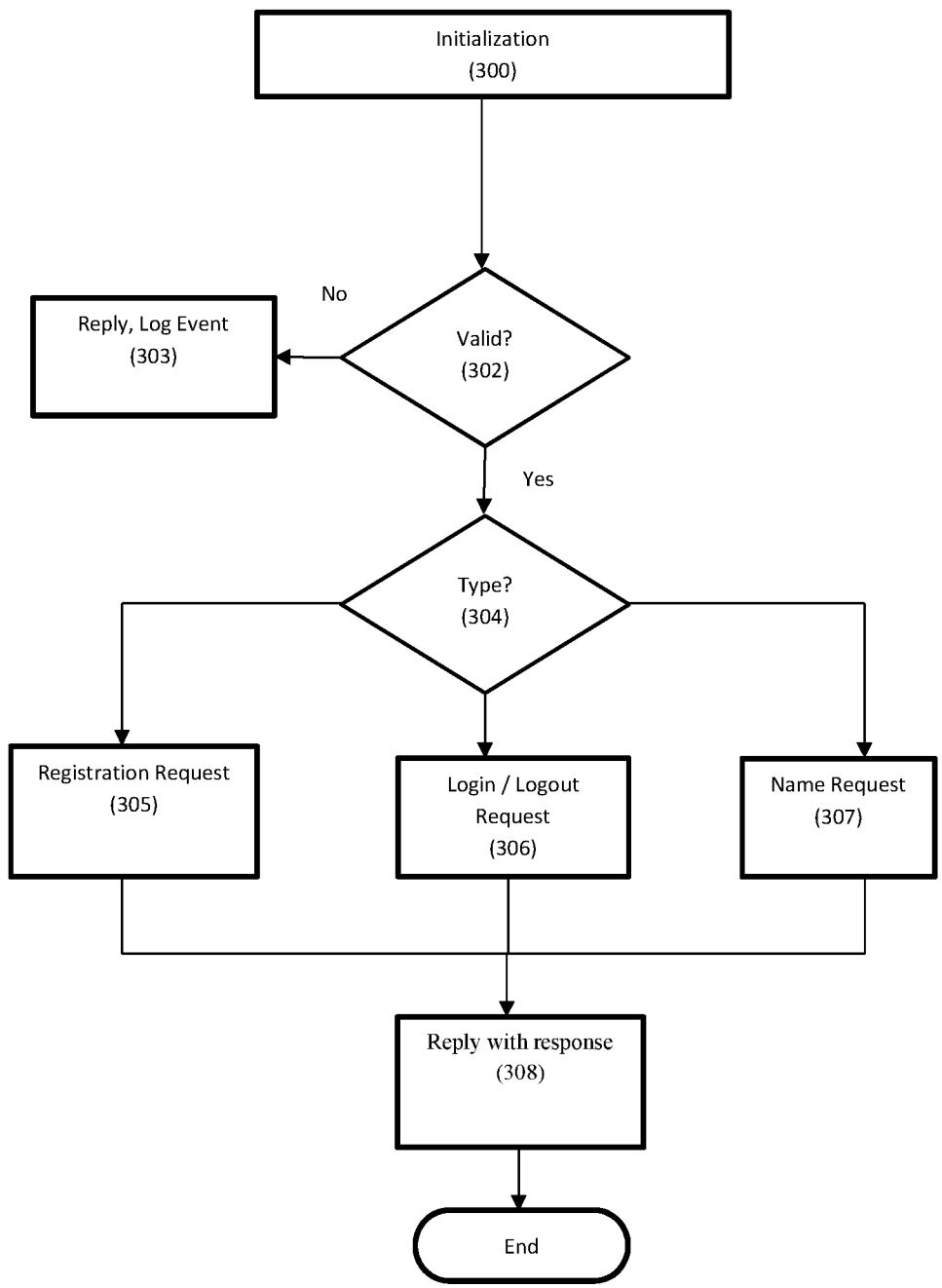
Fig. 14: Alpha Five Application Program pcm4b.a5w Flow Chart

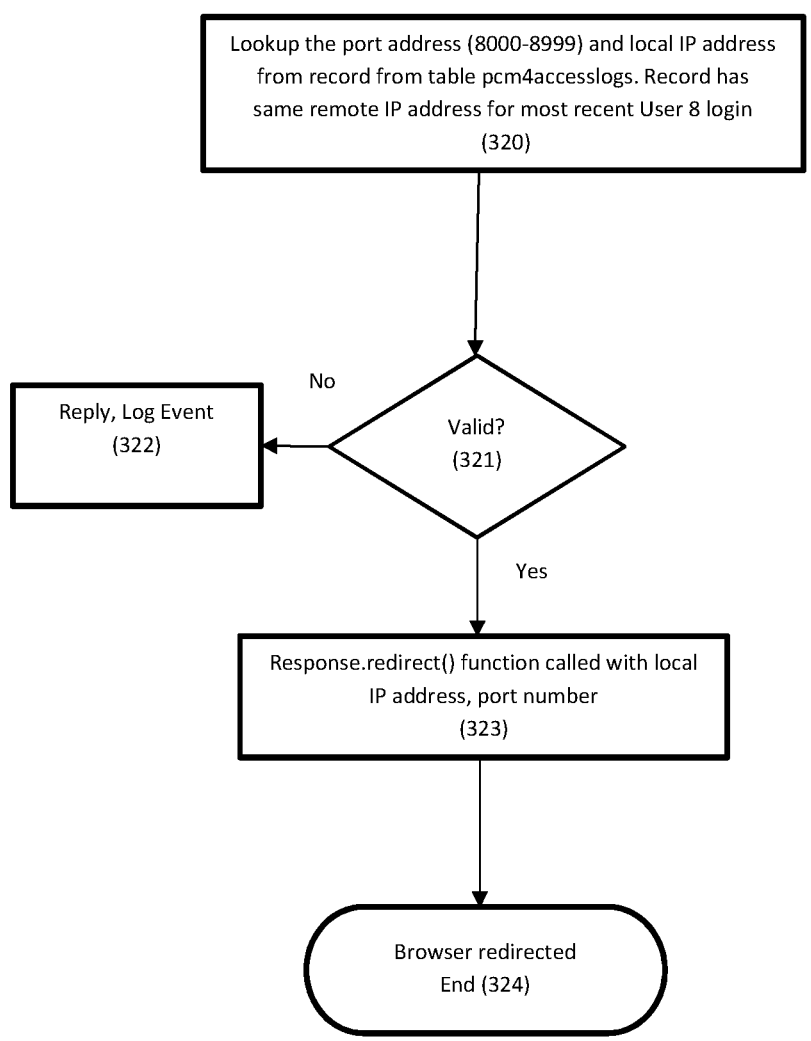
Fig. 15: Alpha Five Application Program studyset.a5w Flow Chart

PERSONAL COMPUTER SYSTEM WITH REMOTELY-CONFIGURED HARDWARE-ENFORCED USAGE LIMITS

CROSS-REFERENCE TO RELATED APPLICATIONS

This application claims the benefit of U.S. Provisional Application No. 62/181,748, filed Jun. 18, 2015.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Parental control time restriction for personal computers are provided through various means including Operating System (OS) settings, network router settings and Internet Service Provider (ISP) features. Maintaining parental controls on a personal computer of a tech-savvy teen can be difficult for many parents. A major limitation of network router settings and ISP features is that limits are only set for internet usage and these settings cannot prevent local use of the computer, including playing games or watching video content previously downloaded.

For most commercially available personal computer OS (i.e. Microsoft® Windows®), the Administrator user has privileges to install, remove or upgrade software. With full access to the OS, the Administrator may add, upgrade or change the operating system itself. The role of Administrator is often delegated to the most technical user of the system, which when this is a child, creates a problem for parents attempting to set usage limits. Even if not set as the Administrator, there are many methods of working around parental controls such as hacking the Administrator password or creating a new Administrator account (using easily found resources on the Internet) or simply tricking a parent into letting the child use the system while logged in as the Administrator. Determined tech-savvy users can also easily create an alternative partition on the hard drive (with an alternative OS without parental controls), boot another OS from a USB flash drive or, even as a last resort, reinstalling the OS or changing out the hard drive altogether.

With the increasing use of personal computers for schoolwork, many parents struggle to ensure their children are using the computer for school rather than playing games or watching videos. While some OS or application parental control features allow the ability to restrict certain applications or web sites, this can be easily bypassed in various ways. This then requires an ongoing, technically-difficult and time-consuming effort on the parent's part to maintain proper parental control settings.

BRIEF SUMMARY OF THE INVENTION

A personal computer with usage limits (when, for how long, and types of use) managed remotely and operating independent of the OS or any program installed on the personal computer. This allows non-technical individuals, such as parents, to set usage limits on a personal computer for which they have no OS System Administrator privileges. Limits can be set independently for up to 7 different users of the personal computer including those with full OS System Administrator privileges. This personal computer operates in three modes—Gaming, Study and No-video. Gaming Mode allows the use of the computer will full video performance such that it is suitable for playing games or watching video content. The Study Mode feature of this personal computer reduces the rate at which video content is refreshed thus effectively preventing the personal computer from being used to play action games or watch video content. A No-Video mode allows the computer to be operated without a display in order to conduct routine maintenance tasks or to listen to music without using allowed Gaming Mode time. Allowed time limit settings can be configured for each mode and independently for each user.

A number of convenience features are provided on this personal computer to assist parents in limiting and moderating use. The Manual Daily Gaming enable feature restricts access to Gaming Mode until explicitly set remotely by the parent. A holiday/one time override feature of this personal computer allows temporary changes to use limits on or between specific dates without requiring parents to remember to change the settings back. This personal computer further allows the use limits of a current login to be extended or reduced by a parent remotely, in real time, without requiring a new OS login. A taper-down feature of this personal computer allows use limits to be automatically reduced over time to help individuals adjust to lowered computer/gaming time gradually.

BRIEF DESCRIPTION OF THE SEVERAL VIEWS OF THE DRAWINGS

FIG. 1 is a detailed block diagram of the personal computer system

FIG. 2 is a drawing showing how Mod Board 2 attaches to Motherboard 1

FIG. 3 Is a schematic diagram of Mod Board 2

FIG. 4 is a perspective drawing of the computer enclosure of this personal computer FIG. 5 is a side view of the mating of Main Switching Board 22a with Video Graphics Adapter 3

FIG. 6-a is an overview diagram of Microsoft® Windows® OS with installed drivers and applications FIG. 6-b is an overview diagram of Linux OS with installed libraries and applications FIG. 6-c is an overview diagram of Remote Server Applications and Programs FIG. 7 is a flowchart of Alpha Five Program Remote Configuration Web Site FIG. 8 is a software operation flowchart for Microcontroller 4

FIG. 9 is a software operation flowchart for Microcontroller 2a on Mod Board 2

FIG. 10 is a software operation flowchart for Single Board Computer SBC 5 Client Application startup FIG. 11 is a software operation flowchart for SBC 5 Client Application system registration process FIG. 12 is a software operation flowchart for SBC 5 Client Application while a user is logged in FIG. 13 is a software operation flowchart for SBC 5 Client Application Wi-Fi configuration FIG. 14 is a software operation flowchart for Alpha Five Application Program pcm4b.a5w FIG. 15 is a software operation flowchart for Alpha Five Application Program studyset.a5w

DETAILED DESCRIPTION OF THE INVENTION

FIG. 1 shows a block diagram of the first embodiment of the personal computer system. It contains the ASRock H61MV-ITX (Mini-ITX style) motherboard 1 that has been modified with the attachment of the Mod Board 2, a small printed circuit board (PCB) approximately 8 mm×12 mm in size. Mod Board 2 contains the microcontroller 2a, the Microchip® PIC10LF322 in a SOT23 case along with support components. Microcontroller 2a contains a software program programmed in "C" and Assembler using Microchip® MPLAB® X IDE 2.1. FIG. 3 is the schematic diagram of Mod Board 2.

Motherboard 1 contains a 9 position (dual row) header called the Front Panel Header. This header is used to connect a motherboard to the power and reset front panel switches and to the power and Hard Disk Drive (HDD) LED Indicators 16 mounted on the computer's front panel. The following is the definition of the standard ATX compatible front panel header:

9 Unused
7 Reset Switch+ 8 Power Switch−
5 Reset Switch− 6 Power Switch+
3 HDD LED− 4 Power LED−
1 HDD LED+ 2 Power LED+

In this embodiment, Power LED and HDD LED Indicators 16 are connected to Motherboard 1 through this header connector however the Reset Switch 14 and the Power Switch 15 are not. As part of the modification to motherboard 1, pins 6 and 7 of the front panel header on motherboard 1 for +Reset and +Power are removed from the front panel header of motherboard 1.

FIG. 2 shows the arrangement of Mod Board 2 mounted on the solder side of motherboard 1. Mod Board 2 contains plated through holes to line up with the front panel header connector pads on the solder side of motherboard 1. Mod Board 2 is placed over these pads on the solder side of Motherboard 1 and soldered at the 7 positions to motherboard 1. Once soldered in place, Mod Board 2 is then covered completely with a permanent non-conducting coating so that no components or signals are exposed. FIG. 3 is the full schematic diagram for Mod Board 2.

Motherboard 1 is also modified with the attachment of the +5V standby cable 1e. +5V standby cable 1e is a single 20 gauge wire 15" in length with an insulated female socket connector at one end and the other end soldered, on the solder side, to the power signal named +5VSB on motherboard 1. This power signal is located at pin 9 of the main power connector of motherboard 1. Once soldered in place, the soldered wire connection is covered with a permanent insulating coating.

On one edge of motherboard 1 are USB, Ethernet, Audio, keyboard and mouser ports, and video Port connectors. Another modification to motherboard 1 is the permanent destruction of the video ports of motherboard 1. This is accomplished by drilling out one or more of the contacts of the onboard VGA and HDMI connectors. A label will cover these connectors stating that the connectors are disabled. Alternatively, disabling onboard video ports can also be accomplished through BIOS setting changes of motherboard 1. As consumer access to the system BIOS settings is rarely necessary, password protecting the motherboard BIOS prevents unauthorized access to these settings. The only way to clear the password is by clearing the onboard battery on motherboard 1, requiring opening the case lid, triggering an alert event. Another method of disabling onboard video is to choose a CPU for motherboard 1 that does not have on board video capabilities.

Additional USB connector headers, intended for front panel USB connectors, are located in the center area of motherboard 1. Installed on motherboard 1 is the Intel® Core i5-3340 Central Processing Unit (CPU) and the Kingston 4 GB 240-Pin DDR3 SDRAM DDR3 1333 desktop memory (model KVR13N9S8/4). Motherboard 1 also has a single PCI Express 3.0×16 expansion slot with the XFX® Double D R9-270X-CDFC Video Graphics Adapter, (VGA) 3 installed in that slot. VGA 3 has two Digital Visual Interface (DVI) output ports, one High-Definition Multimedia Interface (HDMI) ports and two Mini Display port outputs.

In this first embodiment, only the DVI and HDMI ports will be used, however those in the art will understand that other types of video ports can be used. Although the first embodiment includes an ASRock H61MV-ITX (Mini-ITX style) motherboard, Intel® Core i5-3340 CPU, Kingston memory, and the XFX® Double D R9-270X-CDFC Video Graphics Adapter, those in the art will understand that different motherboards or different sizes, CPU, memory and video graphics adapters can easily be substituted.

Computer System Enclosure

FIG. 4 is a perspective drawing of the enclosure of this personal computer. The enclosure comprises the computer case base 21, the system case cover 20, the switching board cover lid 24a, and the switching board cover base 24b. In this first embodiment, the computer case base 21 is the base of the standard Cooler Master Elite 130 Mini-ITX computer case and the system case cover is the top cover of the Cooler Master Elite 130 Mini-ITX computer case. One skilled in the art is aware that other case brands, styles and sizes could be substituted.

Motherboard 1 with VGA 3 is housed within computer case base 21. The DVI video output ports of VGA 3 extend outside the rear of Computer Case Base 21 through the two slot openings 21b. The HDMI female connector of VGA 3 is also available through one of slot openings 21b. Switching board cover base 24b is a custom metal plate with cutouts for the two DVI openings and larger cutouts for HDMI and ventilation. Switching board cover base 24b also has 4 threaded holes as shown on FIG. 4.

Switching board cover base 24*b* secures to system case base 21 after motherboard 1 and VGA 3 are installed in system case base 21. With the 4 hex nuts of the two DVI connectors of VGA 3 removed, switching board cover base 24*b* is placed over the two DVI connectors of VGA 3 that protrude through slot openings 21*b*. Two 4-40 machine screws, one on each DVI connector, secure switching board cover base 21*b* to VGA 3 at the back of computer case base 21. Switching board cover lid 24*a* is a custom metal cover designed to mate with switching board cover base 24*b*. Switching board cover lid 24*a* has cutouts in the back surface for the DVI, HDMI and USB connectors and holes on the sides placed to mate with the threaded holes on switching board cover base 24*b*.

Computer case base 21 also houses the Logisys™ PS550ABK 550 Watts ATX12V power supply 12 (FIG. 1), mounted through the power supply opening 21*f* and connects to a standard 110 or 220 volt alternating current (AC) mains with a power cord attached to power supply 12 on the outside of computer case base 21. Also mounted within computer case base 21 is the Western Digital WD5000LPLX 500 GB hard disk drive, HDD 11*a* and the ASUS Model DRW-24F1ST optical disk drive, ODD 11*b*. HDD 11*a* and ODD 11*b* are mounted in computer case base 21 in locations designated for such types of devices and connect to motherboard 1 with serial ATA cables (SATA) and to power supply 12 with cables from power supply 12. Computer case base 21 has a location for ODD 11*b* with the front panel cutout 21*e* to allow the front panel of ODD 11*b* to extend through the front panel 21*a* and thus allow the disk tray of ODD 11*b* to open so that an optical disk can be placed into ODD 11*b*. Although the Logisys™ PS550ABK power supply and ASUS Model DRW-24F1ST optical disk drive are both used in this first embodiment, other models of these devices could be substituted. While the Western Digital WD5000LPLX 500 GB hard disk drive was chosen for this first embodiment, other models including Solid State Disk Drives (SSD) could be substituted or added.

Referring to FIG. 4, the intrusion detect switch 25 is mechanically secured to computer case base 21. Intrusion detect switch 25 is a long arm, hinge type lever switch with a two conductor cable, the intrusion detect cable 4*c* connected (FIG. 1). Intrusion detect cable 4*c* is wired to the common and normally-closed contacts of intrusion detect switch 25 wired to a 2 pin female connector with 0.1 spacing. Intrusion detect switch 25 is mounted on computer case base 21 at a location such that the lever is depressed and electrically open when system case cover 20 is installed onto computer case base 21 and the lever is not depressed and the contacts electrically conducting when system case cover 20 is partially or completely removed. Although a mechanical lever switch was chosen for this first embodiment, other types of switches are anticipated including optical, magnetic and pull string wires.

Single Board Computer SBC 5—Raspberry Pi

Computer case base 21 also houses the Single Board Computer, SBC 5. In this first embodiment, SBC 5 is the Raspberry Pi Model A+. SBC 5 contains an onboard CPU, microSD card slot for FLASH program memory, RAM and ports for USB, HDMI and a 40 pin connector header for power, Inter-Integrated Circuit (I2C) and General Purpose I/O (GPIO) signals. SBC 5 is mounted into computer case base 21 in a suitable location using a custom mounting plate with 4 threaded standoffs and mounting holes. An 8 gigabyte (gb) microSD flash memory card containing the Linux Debian "Raspian" operating system and installed software applications is plugged into the microSD slot of SBC 5.

Referring to FIG. 1, SBC 5 is powered by the +5VSB (+5 volt standby) DC source through +5V standby cable 1*e* from Motherboard 1 connected to Pin 2 of the 40 pin header (labeled P1) of SBC 5. This connector provides access to power, ground, GPIO pins, I2C and serial interface connections and connects to the cables (with P1 pin numbers listed) described as follows:

Main Switching Board Cable 5*a* (SBC 5 to Main Switching Board 22*a*)

| Pin | Signal name |
| --- | --- |
| 1 | 3.3 V |
| 3 | SDA |
| 5 | SCL |
| 7 | GPIO4 |

+5V Standby Cable 1*e* (from motherboard 1)

| Pin | Signal name |
| --- | --- |
| 2 | +5 V |

+5 USB Power Cable 5*d* (to Main Switching Board 22*a*)

| Pin | Signal name |
| --- | --- |
| 4 | +5 V |
| 6 | Ground |

Reset Switch Cable 5*e* (to Reset Switch 14 on front panel 21*a*)

| Pin | Signal name |
| --- | --- |
| 12 | GPIO18 |
| 14 | Ground |

Power Switch Cable 5*f* (to Power Switch 15 on front panel 21*a*)

| Pin | Signal name |
| --- | --- |
| 18 | GPIO24 |
| 20 | Ground |

Main Switching Board 22*a* and Aux Switching Board 22*b*

In this first embodiment, as shown in the block diagram FIG. 1, the microcontroller 4, the video switch 6*a*, the USB switch 7, the DVI female connector 8a, the USB Network Connector 9a, the Keyboard USB Connector 9b and the cover open detect switch 13a are mounted on the Main Switching Board 22a. Main switching board 22a contains the battery backup circuit 10 comprising a 1 farad supercap, limiting resistor and diodes.

SBC 5 provides 3.3V and 5V DC power, ground and other signals to Main Switching Board 22a through cables described in the previous section. Main switching board 22a also contains several headers used to mate with cables carrying power and signals to/from motherboard 1, Mod Board 2, intrusion detect switch 25 and the Aux Switching Board 22b:

Header 1—Main Board to Aux Board Cable 4d

| Pin | Signal name |
|---|---|
| 1 | +3.3 V |
| 2 | Ground |
| 3 | Vidsel |
| 4 | −Cover open |

This cable provides Aux Switching Board 22b with power and provides the Vidsel 4b video enable signal to dual video on/off switch 6b. The −Coveropen signal connects Aux Cover Open Detect Switch 13b to the Cover Open Detect Switch 13a and microcontroller 4.

Header 2—Motherboard USB Cable 1c

| Pin | Signal name |
|---|---|
| 1 | +5 V |
| 2 | Data− |
| 3 | Data+ |
| 4 | Ground |

This cable connects one of the USB 2.0 headers on motherboard 1 to USB Switch 7

Header 3—Mod Board Control Cable 4a

| Pin | Signal name |
|---|---|
| 1 | U5CTRL |
| 2 | Ground |

This cable connects from Main Switching Board 22a to pins 9 and 8 (diagonally) of the front panel header of motherboard 1. This provides the serial control signal to/from the microcontroller on Mod Board 2.

Header 4—SBC5 +5 USB Power Cable 5d (to Main Switching Board 22a)

| Pin | Signal name |
|---|---|
| 4 | +5 V |
| 6 | Ground |

This cable provides +5V power for USB to Main Switching Board 22a.

Header 5—Intrusion Detect Switch Cable 4c

| Pin | Signal name |
|---|---|
| 1 | −Case open |
| 2 | Ground |

This cable connects Intrusion Detect Switch 25 to microcontroller 4 such that when the case is at least partially open, the −Case open signal will be grounded.

Microcontroller 4

In this first embodiment, Microcontroller 4 is the Microchip PIC16LF1705 microcontroller containing software code programmed in "C" and Assembler using Microchip MPLAB X IDE 2.1. The final code for production is programmed into the device using a suitable commercial microcontroller programmer. Microcontroller 4 receives direct current (DC) power from the battery backup circuit 10 and has signal connections to SBC 5 through Main Switching Board Cable 5a. Pin 14 of the industry standard DVI port is +5V. This pin is used to power an attached monitor's standby circuits. In this embodiment, pin 14 of the first DVI port of VGA 3 is also passed to microcontroller 4 pin 4 through voltage lowering diodes. This is the VGA Power Detect signal 3d.

Microcontroller 4 is a 14 pin SOIC device. The pinout of microcontroller 4 is defined below:

| Pin # | Type | Name and Description |
|---|---|---|
| 1 | Power | VDD (from battery backed power supply 10) |
| 2. | Input | Caseopen - (case lid open) |
| 3. | Output | GPIO4 (general purpose I/O pin used for alert/busy to SBC 5) |
| 4. | Input | VGA Power Detect 3d |
| 5. | Output | Network USB Power (when low, +5 v is powered to Network USB connector 9a) |
| 6. | I/O | U5CTRL - (serial communications port to microcontroller 2a on Mod Board 2) |
| 7. | Output | −USBEN (when low, USB signals are passed through USB switch 7) |
| 8. | Output | USBSEL (USB switch 7 select: 1 = Network USB to SBC 5, 0 = Keyboard to SBC 5) |
| 9. | I/O | SDA I2C Port (data signal of I2C port) |
| 10 | I/O | SCL I2C Port (clock signal of I2C port) |
| 11 | Output | Hotplug (when high, forces the hotplug detect signal low to VGA 3) |
| 12 | Input | Coveropen - (rear cover open, including Aux Switching Board) |
| 13 | Output | Vidsel (0 = SBC 5 HDMI output/1 = VGA 3 output to DVI Female Connector 9a 0 = dual video switch 6b off, 1 = dual video switch 6b on) |
| 14 | Power | VSS (ground) |

Video Switch 6a

Main Switching Board 22a contains the male DVI connector 3a used to mate with the first DVI female connector of VGA 3 to carry signals to the Video Switch 6a without requiring cabling. Video Switch 6a includes the Texas Instruments (TI) TS3DV20812, a 2-Gbps differential switch 8-Bit, 1:2 multiplexer/demultiplexer with 3-side band signals. It is an integrated circuit (IC) with high-speed switching circuits designed for switching HDMI or DVI signals. Since DVI Female Connector 8a, a PCB mount right angle female DVI-D connector, and VGA 3 support dual channel DVI signals, the upper channels of the DVI video signals pass directly through from VGA 3 to DVI Female Connector 8a, bypassing TI TS3DV20812. The HDMI signals from the HDMI female connector on SBC 5 are connected via the HDMI cable 5b mated with an HDMI female connector on Main Switching Board 22a to the first of two input sources of TI TS3DV20812. All the single channel video signals from the first DVI port of VGA 3 are connected to the second input source of TI TS3DV20812. The output signals of TI TS3DV20812 along with the upper channel DVI signals from VGA 3 are connected to DVI Female Connector 8a.

USB Switch 7

In this first embodiment, USB Switch 7 includes the Texas Instruments SN74CBT3257, 4-bit 1-of-2 FET multiplexer/demultiplexer. USB Switch 7 selection and enable inputs are driven by microcontroller 4. USB switch 7 also includes a Vishay Semiconductors Si2371EDS MOSFET switch to switch +5V power to pin 1 of USB Network connector 9a. The gate of this switch is driven by microcontroller 4, pin 5 through a voltage limiting 3.3v zener diode and resistor. This switch is used to force a hardware reset of the USB Network adapter 17 if necessary by completely removing +5v power for at least 3 seconds and then restoring power.

USB Network Adapter 17 is a USB device that provides networking capability to SBC 5 when it is plugged into of USB Network connector 9a and switched to connect to the USB port of SBC 5. In this first embodiment, USB Network Adapter 17 is the Tenda w311MI 150 Mbps Mini Wireless USB Adapter. It provides a local network connection and access to the internet through a Wi-Fi connection to a local Wi-Fi router or access point. One skilled in the art could see how other models of USB Wi-Fi adapters or USB Ethernet adapters could be used instead.

Although the Raspberry Pi Model A+ was chosen for this first embodiment, one skilled in the art could see that other single board computers could be substituted. If an alternate single board computer is chosen and includes more than 1 USB port, portions of the circuits of USB Switch 7 could be removed. If the alternate single board computer contained a built in Wi-Fi or Ethernet, then USB Network Adapter 17 could be eliminated.

Aux Switching Board 22b

Aux Switching Board 22b is a circuit board similar in size to Main Switching Board 22a and connects to Main Switching Board 22a through the Main Board to Aux Board Cable 4d. Aux Switching Board 22b contains the dual video on/off switch 6b comprising the TI TS3DV20812 integrated circuit. Dual video on/off switch 6b switches 2 video sources from VGA 3, HDMI and DVI on or off only. Dual video on/off switch 6b receives DVI video signals from VGA 3 through a male DVI connector 3c on Aux Switching Board 22b mated with the second DVI female connector of VGA 3 without requiring a cable as shown in FIG. 1. The HDMI output of VGA 3 connects to Aux Switching Board 22b and the other input source of dual video on/off Switch 6b through HDMI cable 3b connected between the HDMI output port of VGA 3 and an HDMI female connector on Aux Switching Board 6b. Since dual video on/off switch 6b does not select between two sources, rather only switches two sources on or off, TI TS3DV20812 on Aux Switching Board 22b is connected only to the TDMS Clock+ and Clock− signals of the two video sources from VGA 3. All other signals from the second DVI port and one HDMI port of VGA 3 are passed directly through to the HDMI Connector 8c and the DVI female connector 8b.

Main Switching Board 22 and Aux Switching Board 22b Connect to VGA 3

In this first embodiment, Main Switching Board 22a and Aux Switching Board 22b plug directly into the DVI connectors of VGA 3 on the back and outside of computer case base 21 with male DVI connectors 3a and 3c respectively. Machine screws, one for each connector, secure the boards to VGA 3. Cables connecting Main Switching Board 22a to components inside computer case base 21 route through the opening 21d located on the rear panel of computer case base 21 and above the metal mounting bracket of VGA 3 (see FIG. 4 and FIG. 5). This includes Mod Board control cable 4a, Main Switching Board Cable 5a, cable 4c of intrusion detect switch 25, motherboard USB cable 1c, HDMI cable 5b, and USB Cable 5c. USB cable 5c has a male type A connector (to mate with the USB female connector on SBC 5) on one end and a 4 conductor socket connector on the other.

Switching board cover lid 24a encloses both Main Switching Board 22a and Aux Switching Board 22b with openings for the DVI Female connector 8a and HDMI and DVI female connectors 8b, Network USB connector 9a and keyboard USB connector 9b on these boards as shown in FIG. 4. Hex nuts secure Switching Board Cover 24 to DVI female connector 8a and DVI female connector 8b. For additional mechanical support, switching board cover lid 24a secures to switching board cover base 24b with 4 machine screws.

With switching board cover lid 24a installed, USB keyboard 19 can be plugged into Keyboard USB Connector 9b, USB Network Adapter 17 can be plugged into Network USB connector 9a, and Video Display 18c can be connected to HDMI connector 8c. Once Switching Board Cover 24 is installed and hex nuts secured to DVI female connector 8a and DVI female connector 8b, Video Display 18a and Video Display 18b can be plugged into and mechanically secured to DVI female connector 8a and DVI female connector 8b respectively. This first embodiment allows up to 3 video displays to be used with this personal computer, however one skilled in the art could see that additional switching circuits and connectors could be added to increase the number of video displays supported.

Although this first embodiment includes a standard Mini-ITX motherboard with modifications and several distinct circuit boards, those in the art can see that the functions of Mod Board 2, VGA 3, Main Switching Board 22a and Aux Switching Board 22b and SBC 5 could be placed together on a single custom motherboard or multiple boards in any combination. With further integration, the functions of microcontroller 2a, microcontroller 4, and the system on chip microcontroller on SBC 5 could be integrated into one or more microcontroller or system on chip devices. The first embodiment uses a Mini-ITX motherboard and case however those in the art can see that other sizes of motherboards and cases can be used.

Software

This personal computer employs many different software programs running on the many different central processing units (CPU) within the local system and remotely on remote server 50. The following is a list of software programs referenced in this specification, where they operate, and whether they are standard off-the-shelf programs or custom. This is by no means a complete list of all programs used within this system and remote server 50 however it describes those relevant to this specification.

Standard Software Components

| Name | CPU/Hardware | Notes |
| --- | --- | --- |
| System BIOS | X86 on Motherboard 1 | Standard Motherboard BIOS |
| Windows 7 | x86 on Motherboard 1 | Standard OS |
| Device Drivers | x86 on Motherboard 1 | running on OS For installed hardware |
| Tightvnc Server | x86 on Motherboard 1 | Remote desktop VNC server for Study Mode |
| Linux Debian | SBC 5 - Raspberry PI | Raspian Release |
| Linux Libraries | SBC 5 - Raspberry Pi | Drivers and Python Extensions |
| Python Interpreter | SBC 5 - Raspberry Pi | Runs the client application |
| Wxpython | SBC 5 - Raspberry Pi | Screen functions for Python |
| Wi-Fi | SBC 5 - Raspberry Pi | Python Extensions for Wi-Fi |
| PSutils | SBC 5 - Raspberry Pi | Python utility Extensions |
| nginx | SBC 5 - Raspberry Pi | High performance Web Server |
| xtightvncviewer | SBC 5 - Raspberry Pi | VNC Viewer Application |
| Windows Server 2003 | x86 on Remote Server 50 | OS for Remote Server |
| Apache Web Server | x86 on Remote Server 50 | Web Server for Remote Server |
| Alpha Five Ap. Server | x86 on Remote Server 50 | Alpha Five Application Server |

Custom Software Components

| Name | CPU/Hardware | Notes |
| --- | --- | --- |
| Alpha Five Application | x86 on Remote Server 50 | Alpha Five Application files |
| Initialization Scripts | SBC 5 - Raspberry Pi | Scripts to initialize client application |
| Client Application | SBC 5 - Raspberry PI | Python Scripts |
| Microcontroller 4 | PIC16LF1705 | Assembler and C Language Code |
| Microcontroller 2a | PIC10LF322 | Assembler and C Language Code |

While there are software programs running on various microcontrollers embedded on Motherboard 1, Hard Disk Drive 11a, Optical Disk Drive 11b, Video Graphics Adapter 3, Video Display 18a, Video Display 18b, Video Display 18c, USB Network Adapter 17, Keyboard 19, and power supply 12 these programs operate to provide functionality of these devices and do not interact with other software within this system except to that extent.

Microcontroller 4 Software

Microcontroller 4 is a PIC16LF1705 microcontroller located on Main Switching Board 22a and programmed in "C" and Assembler using the Microchip MPLAB X IDE 2.1. The binary code is programmed into the device using the Microchip MPLAB X IPE 2.1. The flow chart for the operation of this program is shown in FIG. 8.

Microcontroller 2A Software

Microcontroller 2a is a PIC10LF322 microcontroller located on Mod Board 2 and programmed in "C" and Assembler using the Microchip MPLAB X IDE 2.1. The binary code is programmed into the device using the Microchip MPLAB X IPE 2.1. The flow chart for the operation of this program is shown in FIG. 9.

Personal Computer Operating System (PC OS) 35

In this first embodiment the Personal Computer Operating System (PC OS) 35 installed on HDD 11a and executed by the CPU on motherboard 1 is the Microsoft® Windows® 7, 64 bit edition. FIG. 6-a provides a simplified architecture diagram showing some of the components and installed device driver and applications of PC OS 35. The device drivers 36 for motherboard 1, VGA 3 and other installed peripherals are installed. VNC remote desktop server application tightvnc 37 is also installed on PC OS 35. This application is required to support "Study" mode.

SBC 5 Software

FIG. 6-b is simplified overview architecture diagram of the Linux Debian Operating System, Linux OS 40 with installed applications, libraries and Python and Bash scripts. SBC 5 has the Linux OS 40 installed on the microSD card plugged into the microSD socket connector on SBC 5. Linux OS40 is a standard Debian distribution of Linux, called "Raspian" and available for download from the Raspberry Pi Foundation web site. This distribution contains the device libraries providing standard hardware device support and specific support for Python interpreter 42 to support GPIO and I2C communication and networking. The applications/libraries wxpython 44, wifi 45 and the psutils 46 are also installed and provide additional capabilities to Python interpreter 42. The VNC viewer, xtightvncviewer 48 is also installed on Linux OS 40. Xtightvncviewer 48 provides a remote desktop client application that is used in the system's "Study" mode. The web server application nginx 47 is also installed. Nginx 47 is a web server application for Linux OS 40 and is compatible with SBC 5. In this embodiment, nginx 47 is used to serve static web pages and images and as a reverse proxy server to access the web server of the client application 43.

Client application 43 is a custom program composed of Python scripts located in a various file folders and initialized on Linux OS 40 by the Initialization scripts 41. During execution of client application 43, Python language scripts are compiled and executed by Python Interpreter 42.

Linux OS 40 on SBC 5 has further been configured so that client application 43 runs automatically after Linux OS 40 initializes and, using standard configuration options, does not allow the user to control or change its operation. As configured, Linux OS 40 does not allow the user to start, stop, install or remove applications nor access a terminal or the standard LDXE graphical desktop environment. This is accomplished through configuration options within Linux OS 40 and the removal of the LDXE program.

Client Application 43 provides for functions such as product registration, user limit setup, Wi-Fi adapter 17 setup, logging in/logging out of the various operating modes of the system (i.e. gaming mode, study mode), initializing remote desktop client application xtightvncviewer 48, and monitoring alert conditions signaled by microcontroller 4. Client Application 43 also makes server requests to Remote Server 50 (FIG. 6-c) though the local area network, intranet or Internet via USB Network Adapter 17. Client application 43 further provides a simple HTTP web server when a user is logged in so that client application 43 can receive requests from remote server 50 when updates to the settings for the current login are remotely requested and to receive page requests from the web browser running on PC OS 35 for Study mode setup. Client application 43 also communicates with microcontroller 4 through I2C the I2C interface of SBC 5.

Web server application nginx 47 runs on Linux OS 40 and serves to deliver web pages with content provided by client application 43. Devices with networking capability and on the same network as SBC 5 can access this through the Internet Protocol (IP) address of SBC 5. This IP address is the IP address of the WLAN0 device (USB Network Adapter 17) running on Linux OS 40. This IP address is displayed on the Log-In Screen.

Remote Server Software and Database

The first embodiment of the personal computer system maintains usage limit settings on a remote computer system accessible through the Internet. This remote computer system, the remote server 50 is an Intel x86 CPU based server computer located at a data center web hosting facility where it maintains a network connection to the Internet. Installed on Remote Server 50 is the Windows Server 2003 OS 55, the Apache Web Server 52, the Alpha Five Application Server 51, the Alpha Five database 53 and the Alpha Five program files 54. Refer to FIG. 6-c for a simplified diagram of the organization of software installed on remote server 50 and the organization of account directories containing the database records for Alpha Five Database 53.

Alpha Five, from Alpha Software Inc., is a relational database management system and rapid application development platform for building desktop and web applications. Alpha Five database 53 provides the remote database, maintaining the stored limit settings, device configuration settings and actual usage data defined for the personal computer system described in this specification. More than one of the personal computer systems described in this specification can be managed by remote server 50. Alpha Five database 53 maintains the settings for each system in multiple database files stored on remote server 50. Some of the files of Alpha Five database 53 are global and shared among all personal computer systems and others are unique to each user and stored within subdirectories created for each system account. In this first embodiment, Alpha Five database 53 has been configured to be the native database type (.dbf), however other database formats could have been chosen (i.e. SQL).

Alpha Five program files 54 when accessing data records of Alpha Five database 53, provide the content for web pages delivered by Alpha Five Application Server 51 and Apache Web Server 52. In this first embodiment, Alpha Five database 53 and Alpha Five program files 54 were developed using Alpha Five Version 9, Platinum Edition, and then published to remote server 50 through an FTP connection. Alpha Five program files 54 consist of several types of files. The first type of Alpha Five program files 54 delivered by Alpha Five Application Server 51 and Apache Web Server 52 are standard html, image and document files. In addition to web pages delivered directly by remote server 50, certain Alpha Five program files 54 also contain links to other external web sites (i.e. YouTube®) serving other content including video and audio clips.

The first type of native Alpha Five file type are Alpha Five web pages (.a5w extension), and are accessed by server requests to their file name. These files contain HTML content and scripts (javascript and xbasic) that, when requested, are processed by and the resulting output delivered by Alpha Five Application Server 51. Xbasic script is the native scripting language of Alpha Five and is similar to the Basic programming language. The script content in these files is not directly delivered as part of the web page served by Alpha Five Application Server 51.

The scripts of an Alpha Five web page may also contain one or more links to other Alpha Five program files 54 called "components". If the page contains a reference to component files, content provided by these files are delivered as part of the web page when the page is served by Alpha Five Application Server 51. Examples of component files are image files, embedded scripts, HTML code and forms. Certain types of components, called grids and dialogues, are delivered by Alpha Five Application Server 51 as web page database forms to allow an easy web interface for entering and editing data. The development program, Alpha Five Version 9, Platinum Edition, contains tools to create grid and dialogue component files.

In this first embodiment, the Alpha Five web page pcm4b.a5w contains xbasic script to register and unregister the personal computer, authenticate and validate login and logout requests, and to serve name requests. Programs running on SBC 5 communicate to remote server 50 through internet web page requests to file pcm4b.a5w. This communication does not require user intervention and users do not directly access this web page (i.e. through a web browser).

Other Alpha Five web pages serve to allow a user web browser based access to the content of Alpha Five database 53. These web pages include pcm4login.a5w containing xbasic script and a dialog component with fields to allow entry of an ID and password. This page serves as the login page. After a user has been properly authenticated for log in, the script on this page forwards the user to pcm4main.a5w 63, another one of the Alpha Five Program files 54. This page along with other pages allow for the entering and editing of the users and limit settings by authorized users. There are several pages dedicated to system administrative functions including the page pcm4admin.a5w 69 and the page runtime.a5w 72.

Apache Web Server 52 and Alpha Five Application Server 51 are configured to support Secure Sockets Layer (SSL) encryption. An SSL Certificate has been activated for this web site so that requests to this site, whether by SBC 5 or web browsing must be through HTTP protocol with secure sockets layer (https).

Alpha Five Database

In this first embodiment Alpha Five Database 53 consists of tables with records available for access by Alpha Five Application Server 51 and Alpha Five program files 54. Each record of a table consists of fields, each field containing a value of one of several data types. Field data types include numeric, character, date, date/time, time and memo. Each table is a collection of files serving various purposes. The following is a description of the Alpha Five file types used in this first embodiment:

.DBF—This file type contains table data, records with one or more fields, and the definition of the table structure.

.CDX—This file type contains the table indexes. This file is only present if index fields are defined .FPT—This file is only present if a memo field is defined for a table. Memo types are character fields of unspecified length with content stored in dedicated files associated with the table.

The database files are structured as shown in FIG. 6-*c* with a root directory containing the tables pcm4 and pcm4accesslogs. Table pcm4 contains authentication and contact information for all systems accessing remote server 50. Each record of table pcm4 contains a unique numeric account ID that is created automatically by Alpha five Program files 54 during registration. It also contains a unique user id entered by the user registering the system and associated password. This ID and password is the method of accessing the account online and modifying account and user limit settings.

The first database table pcm4 is defined below:

In this first embodiment another table pcm4accesslogs is used to log all server requests and responses to page pcm4.a5w. This database table pcm4accesslogs is defined below:

| Field | Type | Size | Dec | Function |
|---|---|---|---|---|
| Customerid | Numeric | 10 | 0 | Account ID of request caller |
| Userid | Character | 10 | 0 | User ID of request caller |
| Username | Character | 30 | 0 | User Name of request caller |
| Time | Time | 17 | 0 | Time/Date of request |
| Logintype | Numeric | 3 | 0 | Type of login requested |
| Total | Numeric | 8 | 0 | total time in seconds |
| Dailysum | Numeric | 8 | 0 | daily sum of time used in seconds |
| Ipaddress | Character | 15 | 0 | Remote IP address of requestor |
| LocalIP | Character | 15 | 0 | Local IP address (User 8 Logins) of requestor |
| Request | Character | 150 | 0 | Request query string |
| Response | Character | 150 | 0 | Page response to request |

| Field | Type | Size | Dec | Function |
|---|---|---|---|---|
| Customerid | Numeric | 10 | 0 | Customer ID Number Assigned at registration |
| Linkedto | Numeric | 10 | 0 | If nonzero, use this ID for user limit settings |
| Regcode | Character | 8 | 0 | Random code generated by microcontroller 4 |
| Devicestatus | Character | 2 | 0 | Status Code from microcontroller 4 |
| Name | Character | 35 | 0 | System Name (i.e. Family Room PC) |
| Password | Character | 10 | 0 | Password |
| Userid | Character | 10 | 0 | Account Owner ID entered at registration |
| Enable | Character | 3 | 0 | Account Enable: Yes/No/Unr (enable unregister) |
| Timezoneoffset | Numeric | 8 | 0 | Time Zone Offset in seconds |
| Dst | Logical | 1 | 0 | Daylight Saving time 1 = true |
| Firstname | Character | 30 | 0 | Account Owner First name |
| Lastname | Character | 30 | 0 | Last name |
| Email | Character | 120 | 0 | Email |
| Telephone | Character | 10 | 0 | Telephone contact |
| Address1 | Character | 50 | 0 | Mailing Address Line 1 |
| Address2 | Character | 50 | 0 | Mailing Address Line 2 |
| State | Character | 30 | 0 | Mailing Address State |
| City | Character | 50 | 0 | Mailing Address City |
| Zip | Character | 9 | 0 | Mailing Address Zip/Postal code |
| Country | Character | 60 | 0 | Mailing Address Country |
| User9pw | Character | 10 | 0 | System override password |
| Guest | Character | 30 | 0 | Guest user to account Name |
| Guestid | Character | 10 | 0 | Guest user ID |
| Guestpassword | Character | 10 | 0 | Guest User password |
| Guestemail | Character | 100 | 0 | Guest user email address |
| Registered | Date | 8 | 0 | System registration date |
| Subscriptionstart | Date | 8 | 0 | Service subscription start date |
| Subscriptionend | Date | 8 | 0 | Service subscription end date |
| Servicelevel | Character | 12 | 0 | Service subscription level |
| Server | Character | 100 | 0 | Main Server IP/URL |
| Notes | Memo | 10 | 0 | |
| Gholiday_Start | Date | 8 | 0 | Global (all users) holiday date start |
| Gholiday_End | Date | 8 | 0 | Global (all users) holiday date end |
| Config1 | Character | 2 | 0 | microcontroller 4 config registers |
| Config2 | Character | 2 | 0 | |
| Config3 | Character | 2 | 0 | |
| Config4 | Character | 2 | 0 | |
| Config5 | Character | 2 | 0 | |
| Config6 | Character | 2 | 0 | |
| Config7 | Character | 2 | 0 | |
| Config8 | Character | 2 | 0 | |
| Config9 | Character | 2 | 0 | |
| Config10 | Character | 2 | 0 | |
| Lockout | Character | 2 | 0 | Lock out flag due to alert |

A directory for each account is created during registration. One of the tables in this subdirectory is pcm4times. This table contains one record for each user of the system. Each record contains fields defining the limit settings for that user. The fields contain settings for each day of the week, each allowable mode and additional user settings such as user enable/disable, taper down schedules, holiday dates and bonus times allowed.

The database table pcm4times is defined below.

| Field | Type | Size | Dec | Function |
|---|---|---|---|---|
| Customerid | Numeric | 10 | 0 | Account ID for System (same as folder) |
| Name | Character | 30 | 0 | Name of user |
| Usernum | Character | 1 | 0 | Number of User 1-8 |
| Userid | Character | 10 | 0 | User's chosen ID (reserved) |
| Password | Character | 10 | 0 | User's password |
| Phone | Character | 10 | 0 | (reserved) |
| Allowance | Numeric | 8 | 0 | Current Allowance of minutes |
| Weeklyallowance | Numeric | 8 | 0 | Hours of allowance credited weekly |
| Allowanceday | Character | 8 | 0 | Day of week to credit allowance |
| Allowanceenable | Character | 3 | 0 | Enable Yes/no |
| Enable | Character | 3 | 0 | User Enable Yes/No |
| Disabledate | Date | 8 | 0 | Date account disabled |
| Reenabledate | Date | 8 | 0 | Date account reenabled |
| Holiday_Start | Date | 8 | 0 | Holiday start date |
| Holiday_End | Date | 8 | 0 | Holiday end date |
| Taperstart | Date | 8 | 0 | Start date of daily limit taper |
| Taperseconds | Character | 8 | 0 | Number of seconds/day to taper |
| Tapermax | Character | 12 | 0 | Maximum number of seconds to taper |
| Bonustime | Character | 8 | 0 | Bonus time in minutes |
| Bonusdate | Date | 8 | 0 | Date bonus time authorized |
| Notes | Memo | 10 | 0 | (reserved) |

Sunday Settings

| Field | Type | Size | Dec | Function |
|---|---|---|---|---|
| Sunmanenable | Character | 3 | 0 | Manual Daily Enable |
| Sunstart1 | Character | 7 | 0 | Mode 1 Start Time allowed |
| Sunend1 | Character | 7 | 0 | Mode 1 End Time allowed |
| Sunlimit1 | Character | 5 | 0 | Mode 1 Limit in Minutes/day |
| Sunstart2 | Character | 7 | 0 | Mode 2 Start Time allowed |
| Sunend2 | Character | 7 | 0 | Mode 2 End Time allowed |
| Sunlimit2 | Character | 5 | 0 | Mode 2 Limit in Minutes/day |
| Sunstart3 | Character | 7 | 0 | Mode 3 Start Time allowed |
| Sunend3 | Character | 7 | 0 | Mode 3 End Time allowed |
| Sunlimit3 | Character | 5 | 0 | Mode 3 Limit in Minutes/day |
| Sunlockstart | Character | 7 | 0 | Lockout time start all modes |
| Sunlockend | Character | 7 | 0 | Lockout time end all modes |

Monday Settings (Same as Sunday)

| Field | Type | Size | Dec | Function |
|---|---|---|---|---|
| Monmanenable | Character | 3 | 0 | |
| Monstart1 | Character | 7 | 0 | |
| Monend1 | Character | 7 | 0 | |
| Monlimit1 | Character | 5 | 0 | |
| Monstart2 | Character | 7 | 0 | |
| Monend2 | Character | 7 | 0 | |
| Monlimit2 | Character | 5 | 0 | |
| Monstart3 | Character | 7 | 0 | |
| Monend3 | Character | 7 | 0 | |
| Monlimit3 | Character | 5 | 0 | |
| Monlockstart | Character | 7 | 0 | |
| Monlockend | Character | 7 | 0 | |

Tuesday Settings (Same as Sunday)

| Field | Type | Size | Dec | Function |
|---|---|---|---|---|
| Tuemanenable | Character | 3 | 0 | |
| Tuestart1 | Character | 7 | 0 | |
| Tueend1 | Character | 7 | 0 | |
| Tuelimit1 | Character | 5 | 0 | |

-continued

| Field | Type | Size | Dec | Function |
|---|---|---|---|---|
| Tuestart2 | Character | 7 | 0 | |
| Tueend2 | Character | 7 | 0 | |
| Tuelimit2 | Character | 5 | 0 | |
| Tuestart3 | Character | 7 | 0 | |
| Tueend3 | Character | 7 | 0 | |
| Tuelimit3 | Character | 5 | 0 | |
| Tuelockstart | Character | 7 | 0 | |
| Tuelockend | Character | 7 | 0 | |

Wednesday Settings (Same Functions as Sunday)

| Field | Type | Size | Dec | Function |
|---|---|---|---|---|
| Wedmanenable | Character | 3 | 0 | |
| Wedstart1 | Character | 7 | 0 | |
| Wedend1 | Character | 7 | 0 | |
| Wedlimit1 | Character | 5 | 0 | |
| Wedstart2 | Character | 7 | 0 | |
| Wedend2 | Character | 7 | 0 | |
| Wedlimit2 | Character | 5 | 0 | |
| Wedstart3 | Character | 7 | 0 | |
| Wedend3 | Character | 7 | 0 | |
| Wedlimit3 | Character | 5 | 0 | |
| Wedlockstart | Character | 7 | 0 | |
| Wedlockend | Character | 7 | 0 | |

Thursday Settings (Same Functions as Sunday)

| Field | Type | Size | Dec | Function |
|---|---|---|---|---|
| Thumanenable | Character | 3 | 0 | |
| Thustart1 | Character | 7 | | |
| Thuend1 | Character | 7 | 0 | |

-continued

| Field | Type | Size | Dec | Function |
| --- | --- | --- | --- | --- |
| Thulimit1 | Character | 5 | 0 | |
| Thustart2 | Character | 7 | 0 | |
| Thuend2 | Character | 7 | 0 | |
| Thulimit2 | Character | 5 | 0 | |
| Thustart3 | Character | 7 | 0 | |
| Thuend3 | Character | 7 | 0 | |
| Thulimit3 | Character | 5 | 0 | |
| Thulockstart | Character | 7 | 0 | |
| Thulockend | Character | 7 | 0 | |

Friday Settings (Same Functions as Sunday)

| Field | Type | Size | Dec | Function |
| --- | --- | --- | --- | --- |
| Frimanenable | Character | 3 | 0 | |
| Fristart1 | Character | 7 | 0 | |
| Friend1 | Character | 7 | 0 | |
| Frilimit1 | Character | 5 | 0 | |
| Fristart2 | Character | 7 | 0 | |
| Friend2 | Character | 7 | 0 | |
| Frilimit2 | Character | 5 | 0 | |
| Fristart3 | Character | 7 | 0 | |
| Friend3 | Character | 7 | 0 | |
| Frilimit3 | Character | 5 | 0 | |
| Frilockstart | Character | 7 | 0 | |
| Frilockend | Character | 7 | 0 | |

Saturday Settings (Same Functions as Sunday)

| Field | Type | Size | Dec | Function |
| --- | --- | --- | --- | --- |
| Satmanenable | Character | 3 | 0 | |
| Satstart1 | Character | 7 | 0 | |
| Satend1 | Character | 7 | 0 | |
| Satlimit1 | Character | 5 | 0 | |
| Satstart2 | Character | 7 | 0 | |
| Satend2 | Character | 7 | 0 | |
| Satlimit2 | Character | 5 | 0 | |
| Satstart3 | Character | 7 | 0 | |
| Satend3 | Character | 7 | 0 | |
| Satlimit3 | Character | 5 | 0 | |
| Satlockstart | Character | 7 | 0 | |
| Satlockend | Character | 7 | 0 | |

Holiday Settings (Same Functions as Sunday)

| Field | Type | Size | Dec | Function |
| --- | --- | --- | --- | --- |
| Holmanenable | Character | 3 | 0 | |
| Holstart1 | Character | 7 | 0 | |
| Holend1 | Character | 7 | 0 | |
| Hollimit1 | Character | 5 | 0 | |
| Holstart2 | Character | 7 | 0 | |
| Holend2 | Character | 7 | 0 | |
| Hollimit2 | Character | 5 | 0 | |
| Holstart3 | Character | 7 | 0 | |
| Holend3 | Character | 7 | 0 | |
| Hollimit3 | Character | 5 | 0 | |
| Hollockstart | Character | 7 | 0 | |
| Hollockend | Character | 7 | 0 | |

Another table in the Alpha Five Database 53 account directory is pcmlogs. This table contains a record of each login. A record is created for each login and is updated when logged out. The database table pcmlogs is defined below:

| Field | Type | Size | Dec | Function |
| --- | --- | --- | --- | --- |
| Customerid | Numeric | 10 | 0 | Account ID for the system |
| Userid | Character | 10 | 0 | ID of current user |
| Username | Character | 30 | 0 | Name of user |
| Login | Time | 17 | 0 | Login time/date |
| Logout | Time | 17 | 0 | Logout time/date |
| Logintype | Numeric | 3 | 0 | Type of login requested |
| Total | Numeric | 8 | 0 | Total allowed seconds this login |
| Dailysum | Numeric | 8 | 0 | Current daily sum of time used this type |
| Ipaddress | Character | 15 | 0 | IP address of device |
| Port | Character | 4 | 0 | 4 digit port assigned for this login |

Another table in the Alpha Five Database 53 account directory is pcm4alerts. This table contains a record of alert conditions reported remotely and the current status. The database table pcm4alerts is defined below:

| Field | Type | Size | Dec | Function |
| --- | --- | --- | --- | --- |
| Alertdescription | Character | 60 | 0 | Name of the alert reported by SBC 5 |
| Timedate | Time | 17 | 0 | Date and time of the event reported |
| Alertnotification | Character | 120 | 0 | Email address alert status sent to |
| Alertcleared | Character | 20 | 0 | Alert cleared date in character format |
| Clearedby | Character | 30 | 0 | Name of party clearing the alert |
| Alertdevicestatus | Character | 2 | 0 | Current status of microcontroller 4 |
| Ipaddress | Character | 15 | 0 | IP address of device reporting alert |
| Customerid | Numeric | 10 | 0 | Account ID for the system |

While this first embodiment includes Windows Server 2003, one skilled in the art could see how other server operating systems could be used instead, including later versions of Windows or Linux. Also, although Alpha Five® was used as the relational database and development platform for the custom applications running on remote server 50 in this first embodiment, one skilled in the art could see how other relational database systems (i.e. SQL) and scripting languages (PHP) could be used as an alternative.

Operation

Refer to FIG. 1, the personal computer hardware diagram of the first embodiment. The embodiment of the Personal Computer described in this specification is similar to many personal computer systems comprising a motherboard with a Central Processing Unit (CPU) and Random Access Memory (RAM), Hard Disk Drives (HDD), Optical Disk Drives (ODD), Video Graphics Adapter (VGA) and connected to devices such as video displays, keyboard, mice, printers and a local area network. This embodiment differs in that it also contains components serving to enforce usage limits independent of the computer system's operating system. In this embodiment these components include motherboard 1 (with modifications), Mod Board 2, SBC 5, main switching board 22a, and aux switching board 22b. Client application 43 running on SBC 5 (FIG. 6-b) is the central program enforcing limits on the system. Client application 43 communicates with microcontroller 4 on Main Switching Board 22a through an I2C interface. Microcontroller 4, running software loaded into its program memory, selects what video signals are passed to external video displays 18a, 18b and 18c (through video switch circuits) and what USB devices (USB Network Adapter 17 or keyboard 19) are connected to SBC 5 or motherboard 1 (through USB switch circuits). Microcontroller 4 enforces the power state of motherboard 1 through its communication with microcontroller 2a on Mod Board 2.

Client application 43, running on SBC 5, also communicates to remote server 50 through an internet connection provided when USB Network Adapter 17 is switched to SBC 5. The communication with remote server 50 allows client application 43 to authenticate users and obtain their allowed usage limits as configured remotely on remote server 50. Remote server 50 maintains authentication and user limit information in Alpha Five database 53 that is remotely accessible through web based Alpha Five program files 54 (FIG. 6-*c*).

When AC mains power is first available to power supply 12, standby power from PC power supply 12 provides standby power to motherboard 1 and SBC 5. SBC 5 powers battery backup supply 10 on main switching board 22*a* supplying power to microcontroller 4. Standby power to motherboard 1 powers microcontroller 2*a* on Mod board 2 through front panel switch signals 2*b*, specifically Power+ (FIG. 3).

Upon power up reset, I/O port pins of microcontroller 4 are programmed to cause video switch 6*a* to select the HDMI output of SBC 5 be output to DVI female connector 8*a* and both outputs of dual video switch 6*b* are switched off. Microcontroller 4 also selects USB Network Adapter 17 to be connected to SBC 5 through USB switch 7. Upon initialization, programs running in microcontroller 4 and microcontroller 2*a* enforce the power state of motherboard 1 to be off. Microcontroller 2*a* on mod Board 2 enforces the authorized power state of motherboard 1 and forces the system into reset if this is violated.

With power applied to the +5V, SBC 5 initializes— running Linus OS 40, initialization scripts 41, python interpreter 42 and client application 43. Device drivers on Linux OS 40 will automatically detect USB Network Adapter 17 and will attempt to make an Ethernet network connection or Wi-Fi connection using a previous Wi-Fi configuration if it exists. If USB Network Adapter 17 is an Ethernet adapter and properly connected to the local area network, then a network connection would be made automatically with help from the device drivers on Linux OS 40. Client application 43 checks for a network connection to remote server 50. If no network connection is available and a wireless LAN adapter is identified by Linux OS 40, client application 43 calls Wi-Fi setup routines (FIG. 13). If an Ethernet adapter is identified by Linux OS 40 and no network connection is available or neither an Ethernet or Wi-Fi adapter is identified, client application 43 will display an appropriate message and wait for a network connection.

Once a network connection is established, client application 43 communicates with microcontroller 4 to see if microcontroller 4 has been registered with remote server 50. If not, client application 43 calls system registration routines (FIG. 11).

Once registered and with a network connection, client application 43 communicates with remote server 50 to obtain a list of authorized users of the system. This information is maintained as a part of Alpha Five database 53 on remote server 50. This "name request" requires client application 43 first send a Name Request command to microcontroller 4. Microcontroller 4 responds with a 41 character sequence used as the content of a query string as part of a web page request to remote server 50. Once client application 43 has the list of user names and numbers replied by remote server 50, client application 43 displays the login screen (FIG. 10), prompting the user to select login mode, user number and then password.

While at the login or password prompt screens, video display 18*a* displays the content from the HDMI video port of SBC 5 through video switch 6*a*. Dual video switch 6*b* is off. Client application 43 sends a command to microcontroller 4 to switch keyboard 19 to SBC 5 through USB switch 7. Once keyboard 19 is switched to SBC 5, device drivers running on Linux OS 40 detect the keyboard's presence and enable it for operation. Once the user has entered their password on keyboard 19, client application 43 sends a command to microcontroller 4 to switch USB Network Adapter 17 back to SBC 5 through USB switch 7. Device drivers running on Linux OS 40 detect the presence of USB Network Adapter 17 and automatically enable the device and establish a network connection. Client application 43 then takes the login information and sends commands to microcontroller 4 with the login information to preauthorize the user information. This called a "prelogin request". The program running on microcontroller 4 checks to see If the password matches that of the most recent successful login, and if so immediately powers on the computer system via communication with microcontroller 2*a* on Mod Board 2. If the password matched and Gaming mode was selected for login, microcontroller 4 also raises Vidsel 4*b* resulting in the output of VGA 3 switched to video display 18*a* through video switch 6*a* and video displays 18*b* and 18*c* through dual video switch 6*b*. Prelogin requests make logins appear immediate even if the rest of the sequence can take as long as a minute to complete. As part of this prelogin request, microcontroller 4 also creates a 41 character code sequence it places into its output buffer.

This code sequence is sent to remote server 50 by client application 43 as part of a page request with a query string. Remote server 50 receives the page request, validates it, and then serves a web page to client application 43 (FIG. 14). Client application 43 takes content from this page and sends this as a "login command" to microcontroller 4. If not already powered, microcontroller 4 powers the computer system through communication with microcontroller 2*a* of Mod Board 2. Microcontroller 4 switches the output of VGA 3 to video display 18*a* though video switch 6*a* and video displays 18*b* and 18*c* through dual video switch 6*b*, if gaming mode is selected and not already switched. The content from remote server 50 is also used to inform client application 43 about the current login time and remaining time available.

With motherboard 1 set to power on, PC OS 35 (i.e. Microsoft Windows®) loads. If the prior power state of motherboard 1 was sleep or hibernate, the system will attempt to restore its prior state. Otherwise it resets the operating system. All attached video displays (18*a*, 18*b*, 18*c*) will now display the output of VGA 3 with the content from PC OS 35 and running applications.

If Study Mode for login was selected, video display 18*a* remains connected to SBC 5 through video switch 6*a* and dual video switch 6*b* will remain off. Client application 43 then launches remote desktop client application, xtightvncviewer 48 with parameters obtained from the file pcmsetup. Xtightvncviewer 48 communicates with tightvnc server 37 (assuming motherboard 1 has a network connection on the same network as SBC 5) running on PC OS 35. Remote desktop client xtghtvncviewer 48 displays an image closely matching what is appearing on the main display screen of PC OS 35 (typically the output of the first DVI port of VGA 3). Since the content of the display is being transmitted through the Wi-Fi/Ethernet connection and SBC 5 is a relatively low performance computer, the screen is refreshed at about one time per second. This slow refresh rate makes watching videos or playing games difficult, if not impossible, but allows simple web browsing, word processing and the full use of attached devices (i.e. printers).
Logged-In State FIG. 12 provides the flowchart for the operation of client application 43 while a user is logged into the personal computer system. At the start of the logged in state, client application 43 initializes the Python HTTP server using standard BaseHTTPServer and cgi libraries. One of the events client application 43 monitors during the logged in state is the remote login update condition. This occurs when the account holder user, logged in to the Alpha Five remote configuration web site, has made a change to the limit settings in the Alpha Five database 53 and has requested an immediate update be pushed to the system. Under this condition, code running on the Alpha Five web page makes a web page request using the IP address and port number recorded for the current login (Alpha Five database 53 table pcm4logs). Provided that port forwarding is enabled by the router on the local area network that USB Network Adapter 17 maintains a connection, this page request will be received by nginx web server 47 and forwarded to the Python HTTP server running as a part of client application 43. The page request will contain a query string containing the contents required to generate a login command to microcontroller 4. Client application 43, receiving this query string, will then attempt to cause another login or logout using the updated values from this query string. It will use this string to send a new login command to microcontroller 4 and to adjust client application 43 variables including login time, time this login and remaining time. With these variables updated and the update to microcontroller 4, the login will now be adjusted to match the updated values in Alpha Five database 53 on remote server 50.

While logged in, client application 43 and microcontroller 4 continually check for conditions requiring immediate action and possibly forcing a shut down or log out. Client application 43 and microcontroller 4 both track the amount of time allowed for the current login. At various intervals when remaining time is running out, client application 43 sends commands to microcontroller 4 to cause video switch 6a to quickly switch off and back on, thus resulting in a brief blanking of the video signal and screen image. This serves as a warning to the user that time is running out and they should log out or shut down the system soon before it is done for them. The program running in microcontroller 4 also counts down the remaining time (in seconds) allowed. Should time expire without intervention from SBC 5, after a sufficient delay the program in microcontroller 4 will lower Vidsel 4b, switching off video from VGA 3, and cause motherboard 1 to power off or enter standby power state through signaling of Mod Board microcontroller 2a.

While logged in to Gaming or Study Mode, the user can shut down motherboard 1 and PC OS 35 (and hibernate) or put PC OS 35 and motherboard 1 into the standby power state through PC OS 35 (i.e. shut down button on screen in Windows®). This results in VGA 3 powering off, which is detected by microcontroller 4 signaling SBC 5 and client application 43 through an "alert" (raising the GPIO4 signal pin of SBC 5). Client application 43 detects this alert and calls the logout routines (FIG. 12). Logout can also be initialized by front panel power switch 15.

To maintain the integrity of the system, microcontroller 4, continually checks for intrusion into the case or covers of the system. If such an intrusion is detected, microcontroller 4 restricts all users except user 8 from logging in. A log in from user 8 is required to clear this state. This happens regardless of the state of PC OS 35, motherboard 1 or even in the total absence of power from AC mains. Battery backup circuit 10 provides weeks of standby power to microcontroller 4 and all critical alerts are permanently stored in Flash program memory within microcontroller 4 until appropriately cleared.

When the System is Plugged into AC Mains

When AC power is first applied to power supply 12, which is connected to motherboard 1, +5V direct current (DC) standby power is provided by power supply 12 for motherboard 1 and on +5V standby cable 1e which provides +5 volt DC power to pin 2 of P1 of SBC 5. Power supply 12 has all other power supply output voltages off at this time.

Power supply regulators on SBC 5 provide 3.3 volts DC for SBC 5 circuits and made available on pin 1 of the 40 pin header P1. Main Switching Board Cable 5a connects between SBC5 and Main Switching Board 22a providing the 3.3 volt DC power to battery backup circuit 10. Ground and +5 volt DC are provided to Main Switching Board 22a by +5v power cable 5d connected between SBC 5 and Main Switching Board 22a. Battery backup circuit 10 provides approximately 3.0 volts DC power to VDD (pin 1) of microcontroller 4 when power supply 12 is powered by AC mains and approximately 2.4 volts when power supply 12 does not have AC power, relying on a 1 farad super capacitor as a backup power source. Once fully charged, battery backup circuit 10 provides weeks of power to microcontroller 4 when operating in a low-power sleep state.

Microcontroller 4 Operation

When VDD is initially applied to microcontroller 4, all internal registers are initialized and the software programmed into microcontroller 4 begins. FIG. 8 is an overview flow chart of the operation of the software program in microcontroller 4. When microcontroller 4 initializes or is reset from a watchdog timeout, the program initializes (101). During initialization, the program in microcontroller 4 checks to see if microcontroller 4 has been registered by reading certain internal memory locations. If these memory locations have been programmed in Flash program memory (i.e. not all binary "1's") then the program loads these memory locations into program variables for operating settings including registration ID, alert settings and last device status.

Microcontroller 4 contains hardware for I2C serial communications and the software program initializes slave mode 7 bit address operation at address 30h (hex). The I2C slave mode initialization (101) and interrupt handler code (117) to read and write I2C data has been provided by Microchip® and is available from their web site. The software programmed in microcontroller 4 supports 41 read (input) and write (output) registers defined as locations 0-40.

The input registers are written by client application 43 running in SBC 5 using the I2C functions of device libraries 41 installed in Linux OS 40. Input registers 0-39 are considered data registers and byte 40 is the command register. The program running in microcontroller 4 places result values in the output registers with byte 40 typically providing result status. SBC 5 can read these registers at any time however microcontroller 4 drives the GPIO4 port pin of SBC 5 high to provide command acknowledgment/busy and to signal an alert condition to SBC 5 to reduce the need for polling the I2C output registers of microcontroller 4. When the command completes, GPIO4 returns to the low state.

While idle, the program in microcontroller 4 continually waits for I2C command data (102) from SBC 5. When a command is received in input register 40, the program in microcontroller 4 validates the command then branches to process that command (103).

The following steps describe the process of communication when client application 43 sends commands to microcontroller 4.

Communication Sequence SBC 5 to/from Microcontroller 4

1. Client application 43 verifies microcontroller 4 is not busy (GPIO4 is low).
2. Client application 43 loads values in input registers 0-39 as needed for the command.
3. Client application 43 loads input register 40 with the command value. GPIO4 will be driven high by microcontroller 4 as soon as this is registered (busy) and will return low when the command has completed. GPIO4 interrupt program code running in client application 43 running in SBC 5 responds to indicate the process has completed.
4. Client application 43 reads from Status Register (output register 40). To confirm success, the program in microcontroller 4 places the command value from input register 40 to output register 40. An "e" in location 40 indicates an error or failure and other registers can be read to identify the cause of that failure. If an "a" is read at this location, this is an alert and indicates the command did not execute and that status should be checked to identify the alert condition.
5. Client application 43 reads from output registers 0-39 as necessary.

The following section provides a listing of all the command functions of the program in microcontroller 4 and a detailed explanation of the operation and responses.

Microcontroller 4 Command Listing

| Code in location 40 | Command Function |
|---|---|
| 's' | statusreq |
| '0' | logout |
| '1' | login(command) Mode 1 - Normal, Video from VGA 3 |
| '2' | login(command) Mode 2 - Remote Desktop Display (study mode) |
| '3' | login(command) Mode 3 - Computer On but no display |
| 'U' | usbportsw |
| 'n' | usernamereq |
| 'r' | regcodereq |
| 'R' | regsystem |
| 'l' | lastresult |
| 'v' | video glitch |

Microcontroller 4 Command Definition

Read Device Status "s"
  SBC 5 loads input registers:
  0—'x' to clear status result, other values don't care
  1-39 don't care
  40 "s"—status request command
  Microcontroller 4 returns in output registers:
  0—Device Status
  Device Status Register—1 byte
  D0: 1=tilt activated (Critical Alert)
  D1: 1=intrude detect, system case open (Critical Alert)
  D2: 1=intrude detect, switching board cover 24 open (Critical Alert)
  D3: 1=multiple VDD power fails detected (Critical Alert)
  D4: 1=10 second login timeout warning (note that automatic forced logout occurs at 0 seconds)
  D5: 1=Video Card Power Down During login
  D6: 1=Video Card On outside of Login for 75, 135 seconds (note at 240 seconds, hard power off)
  D7: 1=Device reset detected
  D4-6 Cleared on Status Read function, D0-3 (Critical Alerts) cleared on Configuration Set or Login User 8.

1—Current Login Status (ASCII)—"0"=not logged in, "1"-"3" type o login
  2—User Number (current or most recent)
  3—Port A pin values bits 0-6
  4—Port C pin values bits 0-6
  5—Prelogin Count (without a valid login)
  6-9 Number of days since last login or until power down occurred, or 0,0,0,0 if logged in currently
  10—Last Recorded Login Type
  11-24 Last Recorded Login Time/Date in Sorted ASCII Equivalent
  11, 12, 13, 14—Year in ASCII
  15, 16—Month in ASCII
  17, 18—Day of Month in ASCII
  19, 20—Hour in 24 hour format
  21, 22—Minutes in ASCII
  23, 24—Seconds in ASCII (in seconds)
  25, 26, 27, 28, 29—Estimated Login Time Remaining (in seconds, if logged in decimal in 5 ASCII
  25, 26, 27, 28, 29—Time since last login (in seconds, if NOT logged in decimal in 5 ASCII characters
  if power down occurred the above result is the estimate of time when power down occurred
  30-39 '0'
  40 "s"—device registered, "z"—unregistered Alert Conditions—There are two types of Alerts 1) Critical Alerts and 2) Operating Alerts. Operating alerts simply serve to alert SBC 5 of some condition needing attention. Critical Alerts indicate the integrity of the system has been compromised. If a Critical Alert occurs, the program in microcontroller 4 generates an alert condition by raising microcontroller 4 pin 2 connected to SBC 5 (GPIO4). Microcontroller 4 will now only accept Status Request, Name request, Configuration Request, Configuration and Logout commands, Prelogin request and Login commands for User 8. The Configuration command and Login with user 8 clears the Security Alert bits (0-3) while the Status Request command will clear only operating alerts. Other commands will return an "a" (alert) as the response in location 40 and the command will not execute. The Status Request will clear operating alert conditions only when an "x" is placed in location 0.

Load Last Result "l" (lower case L)
  SBC 5 loads input registers:
  0-39 don't care
  40 "l"—
  Microcontroller 4 returns in output registers:
  0-40 From last command result before standby Users Name Request "n"
  Used to provide the query string to send to remote server 50 so it will reply with the names of all the users (1-8) by their number. This command generates the confirmation code so this command will not be responded by the server unless the correct code has been provided.
  SBC 5 loads input registers:
  0-39 don't care
  40 "n"
  Microcontroller 4 returns in output registers:
  0-9—Master User ID
  10-27 "0"
  28-29 2 digit ASCII representation of Device Status Code value in hex
  30-39-10 character confirmation code
  40 "n" if successful
  If no alert is reported in characters 28-29 (representing the Device Status Code), remote server 50 responds with "Name Request Ok:<BR>" followed by a list of names in order of their user number. Each of these names are presented with a number, "." (period), a single space and then separated by the html tag "<BR>". Example:
1. Bill<BR>
2. Fred<BR>
3. Jim<BR>
8. Admin User<BR>

If a Critical Alert is identified, remote server 50 will reply with only the number and name of user 8 and also provides an error message that describes the conditions reported in bytes 28-29.

Prelogin Request and Login Command
SBC 5 loads input registers:
0—User Number (ASCII) "0"=setup,"1"-"8" monitored users "9"-unmonitored
1-10 Password 10 character password (not required for Logout)
11-39 "0" for Prelogin/Logout Requests
11-24 Login Time/Date in Sorted ASCII Equivalent from Server
11, 12, 13, 14—Year in ASCII
15, 16—Month in ASCII
17, 18—Day of Month in ASCII
19, 20—Hour in 24 hour format
21, 22—Minutes in ASCII
23, 24—Seconds in ASCII
25, 26, 27, 28, 29—Remaining time to next time limit (in 1 second increments)
30-39-10 digit confirmation code (ASCII)
40—Login Request type "0"=logout, "1"=game mode, "2"=study, "3"=screen off Microcontroller 4 returns in output registers:
0—User Number (ASCII) 0=setup, 1-8 monitored users 9-unmonitored
1-10 Password 10 character password (entered password), password fail=all blank
11-20 Master User ID for Prelogin Request
21—"0" password failed, "1" password success for Prelogin Request
22-27 "0" for Prelogin Request
28-29 Prelogin Request 2 digit ASCII representation of Device status Code value in hex
11-24 "0" for Logout Request
11-24 Login Time/Date in Sorted ASCII Equivalent from Server
11, 12, 13, 14—Year in ASCII
15, 16—Month in ASCII
17, 18—Day of Month in ASCII
19, 20—Hour in 24 hour format
21, 22—Minutes in ASCII
23, 24—Seconds in ASCII
25, 26, 27, 28, 29—Remaining time to next time limit (in second increments, leading zero)
30-39—n/a for Login Request
30-39-10 digit confirmation code (ASCII) Prelogin or Logout Requests only
40—Pass—Login Request type "0"=logout, "1"=game mode, "2"=study, "3"=screen off
"e" error fail.
"a"—alert error Login Operation In order to allow a user to see the video screen or even turn power on to motherboard 1, a user must be "logged in" using client Application 43 running on SBC 5. There are three modes—1) Gaming, 2) Study and 3) No Video. Up to 8 different users with different passwords and limit settings can log in. In this first embodiment, user 8 has been reserved as the administrator user. Referring to FIG. 1, gaming login mode is the only mode that switches the video outputs of VGA 3 to video displays 18*a*, 18*b*, and 18*c*. All other modes display a program running on SBC 5 with only the HDMI output of SBC 5 switched to video display 18*a* through video switch 6*a*.

Microcontroller 4 controls whether the video from VGA 3 is passed to DVI female connector 8*a* and HDMi and DVI female connectors 8*b* through its control of video switch 6*a* and dual video on/off switch 6*b*. This is through Vidsel signal 4*b* driven as an output of pin 13 of microcontroller 4. Microcontroller 4 also sends commands to microcontroller 2*a* on Mod Board 2 to pulse the Power+ signal of motherboard 1. Therefore microcontroller 4 directly controls when motherboard 1 is powered on or off and what video signals are being passed to DVI female connector 8*a*, DVI female connector 8*b* and HDMI connector 8*c*.

Prelogin is a variation of the Login command of microcontroller 4. This command is used for two purposes. The first causes the program in microcontroller 4 to generate the unique 41 character data sequence that will be sent by client application 43 running on SBC 5 to remote server 50 as a part of the remote server 50 login request. The second purpose is to confirm the local password stored in microcontroller 4 matches the user's entry. If the password matches, microcontroller 4 will immediately power on the system by sending the appropriate command to microcontroller 2*a* on mod Board 2 and will raise signal Vidsel 4*b* if the selected login mode is "Gaming". The result is that the login appears immediate even though the process just began and could take a minute to complete. The "prelogin" counter, an 8 bit variable in microcontroller 4 is incremented each prelogin request and this counter is cleared after a valid Login Command has been received. After 2 prelogin requests, further prelogin requests will not cause microcontroller 4 to power the system through Mod Board 2 or switch the video by raising Vidsel signal 4*b*. This will now only occur on receipt of a valid Login Command from SBC 5. Prelogin requests timeout after 60 seconds and then switch the video back off (if Vidsel 4*b* is a logic "1") and power off motherboard 1 through commands to microcontroller 2*a* on Mod Board 2.

SBC 5 takes the data from the result of the prelogin request from microcontroller 4 and sends it to remote server 50 in the form of a query string as part of the request to web page pcm4b.a5w (FIG. 14) that is a part of Alpha Five program files 54 (FIG. 6-*c*). This page is served by remote server 50 using Windows Server 2003 55, Apache Web Server 52, and Alpha Five Application Server 51. Alpha Five Application Server accesses Alpha Five Database 53 to determine if login of this type is allowed at this time for this user. Alpha Five Application Server 51 returns a web page with either text fields reporting an error or provides the 41 character data sequence used to form the Login Request for microcontroller 4.

If an error is received, SBC reports this error on the screen in the form of a dialog box to inform the user the reason(s) that the current login is not authorized. If login is authorized, SBC 5 loads the 41 input registers in microcontroller 4 using I2C. Writing the final location 41 initiates the Login Command.

The data sequence for an approved login includes information about the current date, time and the remaining time allowed. The program in microcontroller 4 uses this information and independently counts down the time authorized. If the program in microcontroller 4 does not receive a Logout Command by SBC 5 within about 30 seconds of the expected logout time, microcontroller 4 will generate an alert condition to SBC 5. Referring to FIG. 12, this alert (195), received by client application 43 will result in a call to the Logout function (186). As part of this function, client application 43 will send a Logout Command to microcontroller 4 resulting in the lowering of Vidsel signal 4b, if currently in Gaming mode. The Logout Command will also result in microcontroller 4 sending a power off command to Mod Board 2. During a valid Login, if the password does NOT match the currently stored password, then the new password is updated for that user.

User 8 is a special case user. Prelog in time allowed for user 8 is set to 24 hours If and only if the password entered matches the internal password. Once user 8 has been logged in through a full log in and the password stored inside the device, user 8 can be logged in at any time without remote server access. This allows use of the system in any mode when the server is down or the user has no internet capability. If an alert state is detected such as case or covers opened, only prelogin requests and login commands for user 8 are allowed.

Logout Command
  SBC 5 Loads Input Registers:
  0—"z" (to protect against unwanted accidental logout
  1-39 n/c
  40—"0" ASCII
  Microcontroller 4 returns in output registers:
  0—User Number (ASCII) 0=setup, 1-8 monitored users 9-unmonitored
  1-10 User Password 10 character password (entered password), password fail=all blank
  11-20 Master User ID for Prelogin Request
  21-24 "0" for Logout Request
  25, 26, 27, 28, 29—Estimated remaining time in second increments, leading zero, base 10
  30-39-10 digit confirmation code (ASCII) Prelogin or Logout Requests only
  40—Pass—"0"=logout
  "e" fail. Fail result appears in location 1. Password fail does NOT result in a fail code.

SBC 5 takes the 41 bytes of result data from microcontroller 4 and sends this to remote server 50 in the form of a server variable. This causes remote server 50 to record the logout event in Alpha Five database 53.

USB Port Switch Control "U"
  This command is used to set the USB Port switch outputs of the device.
  SBC 5 loads input registers:
  0—USB Port Settings
  D0=USBSEL (0 binary=USBSEL low keyboard 19 to SBC 5, Network off, 1=USBSEL high Network Adapter 17 to SBC5/keyboard 19 to PC)
  D1=USBEN power and signals 0=off, 1=on (0=–USBEN high, 1=–USBEN low)
  1-39 Don't Care
  40 "U"
  Default state is 0
  Microcontroller 4 returns in output registers:
  0-39 Don't care
  40 "U"—successful
  40 "e" (ASCII) if not successful Video Glitch "v"
  This command is used to quickly pulse the video control signal Vidsel 4b to the opposite state and back. When set for 0, the glitch time is 250 milliseconds and will cause a temporary blanking of the video display connected.
  SBC 5 loads input registers:
  0—glitch time in 0.1 seconds. (minimum is 0.25 seconds)
  1-39 Don't Care
  40 "v"
  Default state is 0
  Microcontroller 4 returns in output registers:
  0-39 Don't care
  40 "v"—successful Registration Code Request "r"
  SBC 5 loads input registers:
  0—"0"=Register, "X"=unregister
  1-10 Master User Password
  11-19 Master User ID
  20 don't care
  40 "r"
  If microcontroller 4 is not registered, generates a random 8 digit registration code
  if currently registered and input register 0 is not "X" returns error
  Microcontroller 4 returns in output registers:
  0="0"—User number 0 (setup user) or "X" for unregister
  1-10—Master User Password (right padded with ".")
  11-19—Master User ID 20-27 character registration code ASCII
  28-29—"0"
  30-39—10 character confirmation code
  40 "r" if successful
  40 FFh (binary)—busy
  40 Feh (binary) if not successful, or currently registered
  NOTE: This command must always precede the Register System Command with no other commands being sent to microcontroller 4 in between. The Register System command uses values already stored in the output registers by this command. The returned values can be sent directly to the server to initiate a System Registration.

Register System "R"
  SBC 5 loads input registers:
  0-9—Account ID (10 digit ascii) created on server. 1000000000=unregister
  10-19—Master User ID (10) padded with "."
  20-29—Master User Password padded with "."
  30-39—Confirmation Code (10)
  40 "R"
  Microcontroller 4 returns in output registers:
  40 "R"—Success
  40 FFh (binary)—busy
  40 Feh (binary) not successful (i.e. Mod Board registration failed)

During registration, the program running in microcontroller 4 sends a Register Device command to microcontroller 2a of Mod Board 2. A three digit pseudorandom key sequence is sent as part of the command and stored to internal Flash program memory by the program running in microcontroller 2a. These three "key codes" are used to authenticate all future commands sent by microcontroller 4 to microcontroller 2a (i.e. power on, power off, reset, unregister). If the Register Device command fails, the program in microcontroller 4 returns an error (feh) in output register 40 and will remain unregistered (no registration values stored in Flash program memory). If successful, the master user ID, password, account ID are all stored to program memory within microcontroller 4.

The "unregister" form of this command operates exactly the same except that all registration values within microcontroller 4 are cleared and microcontroller 4 sends an Unregister Device command resulting in all registration values in microcontroller 2a cleared.

System Power Fail Detect

Referring to FIG. 8, the program in microcontroller 4 detects for an SBC 5 power down condition where by polling the state of the I2C pins SDC and SCL (pins 9 and 10 of microcontroller 4). If SBC 5 is powered off the 3.3v power source from SBC 5 is no longer provided to battery backed up power supply 10 on Main Switching Board 22*a* such that microcontroller 4 is now powered by stored battery power alone. To conserve battery power, after detecting 6 seconds of power off (104), the program in microcontroller 4 (SLEEP instruction) causes microcontroller 4 to enter the standby state (105) drawing almost no current (<1ua) from battery backup supply 10.

One of two conditions bring microcontroller 4 out of standby state (105) using the wake up on interrupt features of microcontroller 4. The first condition, an alert condition (106) results when pins of microcontroller 4 connected to intrusion detect switch 25 or cover open detect switch 13*a*/aux cover open detect switch 13*b* are pulled low (0 volts). When this occurs, the state of the pin of microcontroller 4 changes and microcontroller wakes up from standby and begins executing the program code after the SLEEP instruction. The program in microcontroller 4 identifies the condition, stores the alert condition in Flash program memory of microcontroller 4 (107) and sets appropriate program variables. If SBC 5 is powered, pin 3 of microcontroller 4, attached to GPIO4 of SBC 5 is raised by the program running in microcontroller 4 to a logic one. Otherwise microcontroller 4 will return to the standby state (105) if power remains off to SBC 5 for at least 6 seconds (104).

The other condition that returns microcontroller 4 from standby state (105) is restoration of power on pins 9 or 10 of microcontroller 10 (SDC or SCL). After either the alert condition (106, 107) or power is restored, the program returns to wait for I2C commands (102) or to detect another power failure (104). If ten SBC 5 power fail/standby cycles (105) occur without a valid login cycle, an alert condition is generated. This suggests tampering or attempts to deplete standby backup power from backup supply 10.

VGA 3 Power Fail Detect

The most common form of user logout will result from the user of the system using PC OS 35 (i.e. Windows®) manually shutting down or putting the system into "Sleep" or "Hibernate" state. When this happens, PC OS 35 closes files and prepares the system for shut down and then, through software control over hardware on motherboard 1 connected to power supply 12, switches off all power but +5 V standby power from power supply 12 to motherboard 1. With main power to motherboard 1 off, power to VGA 3 installed in the expansion slot of motherboard 1 is also powered off which is detected as power fail on VGA 3. Power to VGA 3 is detected by microcontroller 4 polling the +5V signal of the first DVI port of VGA 3 (pin 14). This signal is connected to pin 4 of microcontroller 4 through two voltage lowering diodes.

While microcontroller 4 is not in the low power sleep state, the program in microcontroller 4 operates in a loop checking for various conditions that require immediate attention. If a user is logged in (108) and power to VGA 3 is no longer detected for at least 3 seconds (111), microcontroller 4 generates a video graphics adapter power down alert, raises the GPIO4 pin to alert SBC 5 (112). Referring to FIG. 12, client application 43, receiving this alert interrupt (195), identifies the alert source (196), and after checking log in status (197) calls logout function (186).

Microcontroller 4 Flash Memory Configuration Settings

The following describe Flash memory locations stored within the program space of microcontroller 4. Each page represents 64 bytes. As program instruction words of microcontroller 4 are only 14 bits, Flash memory locations "bytes" are 7 bits only.

Page 0—Device Settings, Master User ID, PW, Device ID
  0-9 Account ID—10 characters
  10-19 Master User ID—10 characters
  20-29 Master Password—10 characters
  30-59 Reserved
  60-62 3 Character Key Code
  63 Reserved Microcontroller 2*a* PIC10LF322 Software Operation Initial Power Up Referring to the block diagram FIG. 9, microcontroller 2*a* initializes when it first receives power from the Power+ signal from motherboard 1 or if reset by its internal watchdog timeout (120). Microcontroller 2*a* initializes all internal registers and starts executing the software program loaded into the device. The program running in microcontroller 2*a* operates in a loop, first checking to see if motherboard 1 has been powered on and if this was not initiated by microcontroller 2*a* (121). If this happens, the program in microcontroller 2*a* pulses the Reset+ signal of motherboard 1 for at least 250 milliseconds once each 8 seconds. This prevents unauthorized use of motherboard 1 if the system is disassembled and an attempt is made to reuse motherboard 1 without the rest of the system components operating properly. The program in microcontroller 2*a* then waits for commands to be received (123) from microcontroller 4 through the serial single wire interface U5CTRL 4*a*. This communication between microcontroller 4 and microcontroller 2*a* is done through a 6 code sequence:

| Code | Description | Values/range |
| --- | --- | --- |
| 1 | Resync character | 32 decimal |
| 2 | Key Code 1 | 1-31 decimal |
| 3 | Key Code 2 | 1-31 decimal |
| 4 | Key Code 3 | 1-31 decimal |
| 5 | Command Code | 5-9 decimal |
| 6 | Checksum | 1-31 decimal |

Each character is transmitted as a count of 50 microsecond pulses followed by a 30 millisecond idle time. After microcontroller 4 sends the character, microcontroller 2*a* responds by pulsing the U5CTRL 4*a* signal low once during the idle time to acknowledge. Microcontroller 4, seeing the acknowledge pulse can now send the next character. Codes 2-4 are unique key codes that are generated randomly by microcontroller 4 and programmed in microcontroller 4 during product registration.

The fifth code is the actual command being sent to microcontroller 2*a*:

| Code | Command Description |
| --- | --- |
| 4 | Unregister Device |
| 5 | Register Device |
| 6 | Power Up (pulse motherboard 1 +Power line, only if off) |
| 7 | Reset CPU (pulse motherboard +Reset line) |
| 8 | Power Off Hard (hold motherboard 1 +Power for 8 seconds) regardless of state of power |
| 9 | Power Off (pulse motherboard 1 +Power line only if on) |

The sixth code is a 5 bit checksum of the prior 5 codes. When a valid command and checksum has been received (124), then the command is executed (125).

Command Descriptions

Command 5, Register Device (129) causes the Key Codes 1-3 to be stored in Flash program memory of microcontroller 2a. After the device has been registered, all commands received must include these codes or the command will be considered invalid. Too many invalid codes will force extremely long delays making operation/cracking difficult.

Command 4, Unregister Device (130) causes the Key Codes 1-3 to be cleared in Flash program memory of microcontroller 2a. After the device has been unregistered, all commands received no longer require this code.

Command 6, Power Up causes the motherboard 1 Power+ line to be pulsed, but only if the power state of motherboard 1 is off Command 7, Reset CPU causes the Reset+ line of motherboard 1 to be pulsed causing a reset of the x86 CPU on motherboard 1.

Command 8, Power Off Hard causes the Power+ signal of motherboard 1 to be held low for 8 seconds regardless of current state of power. Command 8, Power Off causes the Power+ signal of motherboard 1 to be pulsed once but only if the power state of motherboard 1 is on.

Client Application 43 and Remote Server 50 Registration, Login and Logout Operation Referring to FIG. 1, SBC 5 is powered with standby power from power supply 12 so that it is on as long as the computer system is plugged into the AC mains and power supply 12 is switched on.

SBC 5 and Linux OS 40 Initialization

When SBC 5 is first powered, the CPU on SBC 5 in this first embodiment, the Broadcom BCM2835 system on a chip (SoC), begins executing standard code within its silicon. This program initializes certain on chip hardware, memory and then starts the boot loader of Linux OS 40 located on the microSD card plugged into SBC 5. The boot process includes the initialization of systemd, a suite of system management daemons, libraries, and utilities. All the necessary device drivers are initialized by systemd. Near the end of the systemd initialization process, initialization script 41 begins execution with systemd starting pcm.service (/etc/systemd/system/pcm.service). The following is the script for pcm.service:

[Unit]
Description=Starts PCM pi service
After=modprobe.service
[Service]
Type=simple
ExecStart=/usr/bin/PCM/PCM.sh
Restart=always
[Install]
WantedBy=multi-user.target When systemd processes pcm.service, PCM.sh script (/usr/bin/PCM/PCM.sh) is executed. The following is the script PCM.sh:
!/bin/bash
sudo xinit/usr/bin/PCM/PCM4/run-python.sh -- -nocursor
sudo setterm -blank 0-powersave off -powerdown 0
sudo xset s off PCM.sh executes the run-python.sh script inside an x window with sudo (superuser privileges) and the -nocursor (no mouse cursor) parameters (/usr/bin/PCM/PCM4/run-python.sh). The following script is run-python.sh:
!/bin/bash
sudo setterm -blank 0-powersave off -powerdown 0 sudo xset s off
python/usr/bin/PCM/PCM4/MainApp.py The run-python.sh script runs Python interpreter 42 and calls for the start of client application 43, which begins with Python script MainApp.py (/usr/bin/PCM/PCM4/MainApp.py). FIGS. 10 11, 12 and 13 are the flowcharts of the operation of client application 43. Referring to FIG. 10, client application 43 initialization (150) starts by initializing a number of Linux OS 40 system functions and copying files used by web server nginx 47. Client application 43 starts nginx 47 web server and loads libraries wxpython 44, wifi 45, and psutils 46 and application xtightvncviewer 48 as required in each software module. Screens displayed by client application 43 on SBC 5 use wxpython libraries 44. Client application 43 initially detects if SBC 5 has Wi-Fi or Ethernet with internet access (152). If not and no Wi-Fi adapter is found or if an Ethernet adapter is found but not connected to the local network, a screen with an appropriate message is displayed and client application waits until a network connection is available (161). If a Wi-fi adapter is found, client application 43 directs the user to a Wi-Fi Configuration Function (200).

Wi-Fi Configuration

The flowchart of the Wi-Fi Configuration function is shown in FIG. 13. The initialization of this function (200) begins with switching the USB Network Adapter 17 to SBC 5. This is accomplished with client application 43 sending the USB Switch command to microcontroller 4 through I2C. Client application 43 waits 5 seconds then scans for available Wi-Fi routers/access points using calls to Python library wifi 45. If the scan is successful (201) the program displays a menu list of routers/access points by their SSID and sends the USB Switch command to microcontroller 4 to switch USB keyboard 19 to SBC 5 (202).

The user switches between routers/access points (SSID) highlighted using the <tab> key and makes a final selection by pressing the <enter> key (202). A new screen will be displayed to prompt for the passcode associated with the selected router/access point (204). The user enters the passcode using keyboard 19. If a valid length passcode is not entered, then a retry is prompted (204), otherwise client application 43 switches USB Network Adapter (Wi-Fi) back to SBC 5 and attempts to connect to the router/access point selected using the entered passcode (206). If connection is not successful, then the program displays an error message (208), resets USB Network Adapter 17 (203) and then returns to the start of the function (200).

If connection was successful, the Wi-Fi configuration is written to the file named "interfaces" stored in folder location/etc/network/ (209). The program then branches to the client application startup (150) shown on FIG. 10.

If not successful in identifying any Wi-Fi routers/access points (201) during scanning, client application 43 resets USB Network Adapter 17 (203). This function removes power and signals from Wi-Fi adapter 17 (FIG. 1) by switching USB keyboard 19 to SBC 5 using the USB Switch command to microcontroller 4, waiting 5 seconds and then switching Network adapter (Wi-Fi) 19 back to SBC 5, again using the USB Switch command to microcontroller 4. After this reset, the Wi-Fi configuration function then reinitializes (200).

System Registration: Introduction

In order for the system to operate and communicate securely with remote server 50, the system must first be registered. This can be accomplished during the production process or can be done by the user when they install the computer. During this process, client application 43, running on SBC 5, communicates with microcontroller 4 and remote server 50, passing certain account codes and passwords back and forth. Microcontroller 4 communicates with microcontroller 2a and registration values are stored within both devices to be used for secure communication between them during normal operation. During registration, remote server 50 creates an account with the necessary files and database entries.

During communication between SBC 5 and Microcontroller 4 and between SBC 5 and Remote Server 50, 41 ASCII character code sequences are sent. Microcontroller 4 receives and outputs these codes through its 41 I2C registers and Remote Server 50 receives these codes through web page requests with a query string and outputs the code sequence in ASCII form through the web page returned. These code sequences contain a 10 character validity code that uses a checksum of all the other characters in the 41 character data packet to ensure the validity and integrity of the data. Microcontroller 4 and remote server 50 both have program code that can compute and validate this checksum. Note that client application 43 running on SBC 5 does not.

System Registration: Operation

Refer to FIG. 11 and FIG. 14 to follow the registration process of client application 43 running on SBC 5, and remote server 50 respectively. FIG. 14 describes the flow of the program running on Alpha Five web page pcm4b.a5w. Also refer to FIG. 8 for the process running on microcontroller 4 and FIG. 9 for the process within microcontroller 2a on Mod Board 2.

Registration Screen (170)

Referring to FIG. 11, provided SBC 5 has network (i.e. Wi-Fi) and internet access, registration beings with a screen displayed prompting the user to enter an account ID, Password, password and email address (170). Client application 43 sends the USB Switch command to microcontroller 4 to switch USB keyboard 19 to SBC 5.

Registration Request (171)

Once the registration information has been input by the user using keyboard 19, client application 43 sends the USB Switch command to microcontroller 4 to switch USB Network Adapter 17 to SBC 5. The ID and password along with other information is now written to microcontroller 4 by client application 43 as a Registration Request Command. The resulting 41 bytes from microcontroller 4 are sent as a 41 character query string, a part of the URL of the web page request made by client application 43 to remote server 50. Part of this query string is a 6 character random code sequence stored in microcontroller 4. Referring to FIG. 14, if the registration request made by client application 43 on SBC 5 to remote server 50 is valid (302) and authorized by remote server 50, the xbasic script on the Alpha Five web page executes the Registration Request function (305).

Remote Server 50 Registration Request Function (305)

The registration request function (305) begins by checking the registration information provided through the page request by SBC 5 to confirm that the device is not already registered or the ID and email address are not already in use by another user. If a user attempts to register a system with an ID that is already used, the script program on pcm4b.a5w will check to see if the ID, password and email address all match. If so, the registration request (305) will be allowed and will share the same ID, password and primary email address. By allowing multiple accounts to share the same login information, the account holder only needs one ID and password to access the configuration for multiple systems. The multiple systems can then be individually configured or can be configured to share the same configuration.

If one or more error conditions are identified, an error message is sent as the response (308). The error message is reported by client application 43 and the user is prompted to try again or contact customer service, depending on the error reported.

If the registration request is valid, the program script on page pcm4b.a5w running on remote server 50 creates the necessary database files and file directories in Alpha Five Database 53. This includes database files for time limit settings for the "Default User" (user 1), "Admin user" (user 8) and master authentication entries such as the account ID, password and email address. After setting up the account for the registering system, a 41 character sequence is composed and sent as part of the reply (308).

Register Microcontroller 4 (173)

Referring back to FIG. 11, the reply from remote server 50 is checked for success (172), and if so, the 41 character sequence from the reply to client application 43 running on SBC 5 is loaded, without modification, to the 41 input registers of microcontroller 4. The last character of this sequence is the "R" character, for the Register System Command. Referring to FIG. 8, the program running on microcontroller 4 after seeing that this character has been loaded into location 41, identifies the command has been received (102) and processes the command (103).

Microcontroller 4 Register Command

During execution of this command, the program running in microcontroller 4 stores important values in Flash program memory and sends a Register Mod Board Command to microcontroller 2a of Mod Board 2. This command to microcontroller 2a is sent through a serial data sequence using single wire interface U5Ctrl 4a (FIG. 1). Referring back to FIG. 11, if this does not complete successfully (174), the registration of microcontroller 4 is aborted and an error is reported back through output register values of microcontroller 4 and client application 43 will retry. If registration completes successfully, client application 43 returns to (see FIG. 10) Client Application Startup (150).

User Login (FIG. 10)

Once client application 43 has Wi-Fi/Ethernet (152) and Internet access and determines that microcontroller 4 is registered (151), client application 43 can proceed toward a user login. Checks for network/Wi-Fi and registration are completed each time by client application 43 when SBC 5 is powered or reset however these screens will not be displayed if the system is already registered and has network and Internet access.

User Name Request (153)

User login begins with the User Name Request command sent by I2C to microcontroller 4 by client application 43 running on SBC 5. After client application 43 sends the command to microcontroller 4, the program running on microcontroller 4 outputs a 41 character data sequence in the output buffer of microcontroller 4. This data is read by client application 43 and sent to remote server 50 through a web page request (pcm4b.a5w) with a query string.

Referring to FIG. 14, the program script running on the page validates the request (302), and if valid, checks to see if the account is linked to a master account. If it is linked to master account, the program will access database records from that account to respond to the request. The request is now identified as one of three types of requests Registration Request, Login/Logout and Name Request (304).

Assuming the request to remote server 50 was a valid Name Request, the program script running on pcm4b.a5w checks the 2 character device status code portion of the query string. If this suggests a critical alert condition, this alert is logged (pcm4alerts), and an email message is automatically sent to the email address provided in the account profile for the system (table pcm4). The program composes a web page containing only one enabled user name ("8. Admin User") in text form (307) and then replies with this page (308). If also provide a message indicating the exact nature of the critical alert reported.

If no critical alert condition was reported by the name request from SBC 5, the program running on pcm4b.a5w composes a web page containing a list of all enabled user names in text form (307) and then replies with this page (308).

Client application 43 receives this response (153) and displays this in the form of a prompt to allow the operator to select their user number at the Login Screen (154). Client application 43 then sends the USB Switch command to microcontroller 4 to switch USB keyboard 19 to SBC 5.

Login Screen (154)
Mode Selection

Referring to FIG. 10, in this first embodiment, Login Screen (154) allows a user to change or select the type of login mode (G=Gaming, S=Study, N=No video, x=unregister system) by pressing the appropriate key ("g", "s", "n", "x") on keyboard 19, which is switched by USB switch 7 to be enabled to SBC 5. The default login type is "Gaming" and the selected login mode is always displayed at the top of login screen (154). Although No Video mode is an allowed login type, this mode is most often used to allow a user to continue to keep the computer operating without a display and without using time on one of the other modes (i.e. listen to music).

User Number Selection and Password Entry

The user selects the user number by pressing the single digit corresponding to the user number displayed with their name. Once they have pressed a valid key, a password prompt screen is displayed. The user now can enter their password (up to 10 characters) followed by the <enter> key.

After the password is entered, client application 43 takes the entered user number and password, and assembles it into the Prelogin Request command which is loaded into the input registers of microcontroller 4 using I2C. Upon receiving the Prelogin Request command, microcontroller 4 checks to see if the password matches the last recorded valid password used by this user. If the password matches AND if there has been less than 2 prior Prelogin Requests without a valid Login Request, microcontroller 4 sends commands to Mod Board microcontroller 2a to immediately pulse the Power+ signal of motherboard 1 in order to turn motherboard 1 on. Further, if Gaming mode was selected, microcontroller 4 raises Vidsel signal 4b to video switch 6a and dual video on/off video switch 6b. In response to the Prelogin Request from client application 43, microcontroller 4 provides a 41 character code sequence in its output register for client application 43 to read. Output register 21 of microcontroller 4 returns with a"1" character if the password matches and a "0" if the password did not match. If client application 43 identifies from location 21 that the passwords did not match (155), client application 43 prompts again for the password and resends another Prelogin request to microcontroller 4 with the second password (156).

Server Login Request (157)

Referring to FIG. 10, if the first password matched (155) or after a retry with a second Prelogin Request (156), client application 43 starts the Server Login request (157). Server login request (157) starts with client application 43 sending the USB switch command to microcontroller 4 to switch USB Network Adapter 17 to SBC 5 and waiting for network and internet access. Client application 43 then sends a page request to remote server 50 using the 41 ASCII characters returned by microcontroller 4 as a query string made along with the page request.

Referring to FIG. 14, after receiving the page request, remote server 50 validates the request (302), and if valid, checks to see if the account is linked to a master account. If it is linked to master account, the program will access database records from that account to respond to this request. Remote server 50 responds with either a web page containing an error message (i.e. no current time available, invalid data, etc.) or if successful, a 41 byte ASCII code sequence and the assigned port number (8000 to 8999), in text format for this login. Remote server 50 updates the user log files of Alpha Five Database 53 to record the IP address, assigned port number, time, date and remaining time allowed and used for the current day. If the account is linked to a master account, the program will update the log files from the master account rather than the linked account.

Referring to FIG. 10, if an error is reported by the reply from remote server 50, client application 43 displays the error and send a USB Switch command to microcontroller 4 to switch USB keyboard 19 to SBC 5 (159) and then returns to Login Screen (154).

Login Request to microcontroller 4 (160)

If the remote server request was successful, client application 43 takes the 41 character sequence and sends it as Login Request to microcontroller 4 (160). If the login mode was Gaming Mode or No Video mode, client application 43 runs the Logged-in Runtime Initialization function (180). Refer to FIG. 12 for the flowchart for SBC 5 client application 43 during the logged in state.

Study Mode Login

If the login mode was Study Mode, client application 43 reads configuration file pcmsetup from the webserver directory of Linux OS 40. This file contains the configuration IP address for the remote desktop client application. Client application 43 loads the default screen for Study mode with the IP address information and a message stating that that either port 5900 is blocked with the firewall on PC OS 35 or the Study Mode needs to be configured by user 8. Client application 43 makes an OS call to run xtightvncviewer 48 using the IP address from the pcmsetup file. If the operation fails, the default screen will remain, otherwise the remote desktop screen from xtightvncviewer 48 will be displayed. Xtightvncviewer 48 is configured to run full screen and the local mouse cursor is disabled. Client application 43 now runs the Logged-in Runtime Initialization function (180).

Unregister Login

A user 8 login with mode "x" selects the "Unregister system" login. Client application 43 displays the Registration Screen as described in a previous section. The user then enters the same exact information: ID, password, and Email address. The client application 43 executes the same code as to register the device except an "X" character is put in location 0 (rather than "O") of the Registration Command sent to microcontroller 4. Microcontroller 4 responds by placing the 41 characters in its output buffer. Client application takes this 41 character sequence and uses this as the query string sent to remote server 50 as part of a Registration Command. Remote Server 50 validates the request for unregister, and if allowed, returns the 41 character code with an Account Id set to "1000000000". Remote server 50 also modifies values in Alpha Five Database 53 to indicate the account is unregistered. The 41 character code returned by Remote Server 50 is received by client application 43 and sent to microcontroller 4 as an "unregister" form of the Registration Request command.

If successful, the program in microcontroller 4 clears all internal registration values in Flash program memory and sends an Unregister Command to Mod Board microcontroller 2a. The program in microcontroller 2a resets the registration values stored in the Flash memory of microcontroller 2a. The system is now available for a new registration. Note that Remote Server 50 must validate the request and certain settings in Alpha Five Database 53 associated with the current registration may prevent an unregister request unless set by an authorized individual from the manufacturer of the system.

Once the unregister function completes successfully, client application 43 initiates a full reset of Linux OS 40

Logged in Runtime

Logged In Runtime Initialization (180)

Referring to FIG. 12, the Logged-in Runtime Initialization Routine (180) performs several tasks. First the routine initializes the status display screen (wxpython) running on SBC 5, displaying the type of login, user number, log-in time/date, time logged in (hours/minutes/seconds), estimated logout time and current remaining time available in hours, minutes and seconds. Second, it modifies the file, index.html, located in the data space of nginx server 47. This file, a simple html status page provides up-to-date information on the current login such as type of login, user number, log in time/date, estimated log out time, time logged in and current remaining time available. This page also contains javascript to count down (client side) and display remaining time updated to the second.

Nginx web server 47 delivers this page to web enabled devices on the same network as SBC 5 when the IP address and port of nginx web server 47 on SBC 5 is accessed. Note that this connection is only maintained when a user is logged in.

Third, the Logged-in Runtime Initialization Routine (180) initializes the Python HTTP server using standard BaseHTTPServer and cgi libraries. The program will initialize the server using the port address (8000-8999) assigned by remote server 50, provided as part of the login reply.

Client application 43 includes a function httpServHandler (187) that is called when an HTTP page request is received at the configured port number (8000-8999) assigned by remote server 50. It also initializes a local string variable loginupdate. After initializing the HTTP server, client application 43 begins a loop checking for 1) a remote login update (181), 2) login time out (182), and 3) low time remaining warning condition (183).

Lastly, the routine starts a wxtimer thread (wxpython) set to 1 second. Each second this routine sets a variable flag "second elapsed" to a logic "1" indicating a second has elapsed. This flag is checked in the periodic updates function (185).

Study Mode Setup

Study Mode requires the configuration of xtightvncviewer 48 to allow it to connect with tightvnc server 37 running on PC OS 35. The IP address of tightvnc server 37 is based on the IP address of the system, which will vary depending on the connected local area network. Rather than require the user to find the IP address, write it down, and then enter the IP address in a setup program running on SBC 5, this first embodiment includes an easy method of configuring xtightvncserver 48. This only requires the user to log in as Admin user 8 and then click on a shortcut that is provided on the desktop screen of PC PS 35. This shortcut is named "Study Mode Set".

On the PC OS 35 desktop screen there is a shortcut that launches the web browser with a URL of remote server 50 and page "studyset.a5w" (FIG. 15). This Alpha Five web page runs a program script that will perform a lookup from Alpha Five Database 53 (pcm4accesslogs) to get the local IP address and port number of the current user 8 login with the same remote IP address (320). This assumes the network connection to SBC 5 and PC OS 35 are on the same local area network and route to the same cable model and thus maintain the same remote IP address to distant servers.

With a valid user 8 logged in (321), the program running on page studyset.a5w redirects the page using the local IP address and port number using the Alpha Five response.redirect function (323). This causes the web browser running on PC OS 35 to directly access the address of the redirected page (324). The address of the redirected page is the local IP address of SBC 5.

Referring to FIG. 12, receiving the local page request, web server nginx 47 forwards the request to Python httpServHandler (187). Python httpServHandler (187), validates the request and extracts the IP address from the caller (local IP address of the network connection of PC OS 35) and saves this value in file pcmsetup. Then httpServHandler (187) replies with a message indicating Study Mode configuration has been updated and the user must now login to Study Mode to verify operation.

Remote Login Update

The purpose of a remote login update is to allow real-time changes to a current login. For example, say the account holder wants to force the current user to logout automatically in 10 minutes or alternatively wants to extend the current login by 20 minutes. Either of these can be done during a current login and without forcing an apparent logout and disruption of the current user's login and operation of the system.

To force a remote login update, the Account Holder, logged in to the Alpha Five remote configuration web site (FIG. 7), when accessing User Limits screen 65, makes a change to the limit settings in the Alpha Five database 53 and selects the option "Force Immediate Update" when submitting the updated page.

When this option is selected upon submit, code running on the Alpha Five web page pcm4main.a5w (FIG. 7) makes an HTTP web page request using the IP address and port recorded for the current login (Alpha Five database 53 table pcm4accesslogs). This request includes a 41 character query string in the URL that contains the updated login values for the Login Command to be sent to microcontroller 4.

Provided that port forwarding is enabled by the router on the local area network that USB Network Adapter 17 maintains a connection, this page request will be received by nginx web server 47 and, as it is configured as a reverse proxy, nginx web server 47 forwards the request to the Python HTTP server, specifically function httpServHandler (187) of client application 43 (see FIG. 12). Note that nginx web server 47 directly handles page requests on other ports. When the page loginupdate.html is requested with a query string, httpServHandler (187) will extract the 41 character value from the query string in the request and save this value in variable loginupdate. No reply to the page request is generated by httpServHandler (187) at this time.

Client application 43 monitors for the remote login update condition by checking the value of local variable loginupdate (181). If the variable is found to be non-blank, it is checked for validity. If invalid, the variable is cleared. If valid, client application 43 diverts to the remote login update function (188).

Login Update Function (188)

This function will then attempt to cause another login using the updated values from this query string. It will use this string to send a new login command to microcontroller 4 and to adjust client application 43 variables including login time, time this login and remaining time. If the new login completed successfully, then a reply indicating success is generated in response to the HTTP request. If it fails, then a reply indicating failure will be generated. Alpha Five Program pcm4main.a5w 63, receiving the success response, records a logout and a new login by updating entries in pcm4logs in Alpha Five database 53.

Client application 43 continues in the program loop again checking for 1) a remote login update (181), 2) login time out (182), and 3) low time remaining warning condition (183) and 4) periodic updates (185).

Periodic Updates (185)

The periodic update routine checks the second elapsed flag to see if it is set to a logic one. If so, the flag is cleared and the remaining time available (in minutes and seconds) is decremented by one second. The routine updates the login display screen (wxpython) of client application 43. When the minutes count changes (i.e. seconds roll over from 0 to 59), this function reads, modifies and writes out the file index.html (located in the data space of nginx server 47) with new values.

Low Time Remaining Warning

Client application 43 running on SBC 5 continually checks the remaining time available and if below 10 minutes (183) starts issuing low time warnings (184) periodically. In this first embodiment these time warnings are provided by briefly blanking the video periodically at exactly 10 minutes, 5 minutes, 3 minutes, 2 minutes and each 15 seconds thereafter until 45 seconds remain. In order to blank the screen briefly, client application 43 running on SBC 5 sends the Video Glitch command to microcontroller 4. One skilled in the art could see how the time selected for warnings could be changed or even made user configurable. One skilled in the art could also see how additional warning methods could be employed, including using audible warnings generated by client application 43 using, for example, the audio output port of SBC 5 connected to the audio inputs of motherboard 1 or a buzzer device connected to SBC 5.

Login Timeout

If the remaining login time count expires (182), client application 43 initiates a log out operation by calling the Logout Function (186). Logout function (186) begins by sending the Logout Command to microcontroller 4. In response to this command, the program running in microcontroller 4 executes its own logout function, lowering Vidsel 4b if microcontroller 4 was logged in as Gaming Mode. Microcontroller 4 sends the Power Off command to microcontroller 2a on Mod Board 2 to pulse the Power+ signal on motherboard 1. Further, Microcontroller 4 outputs a 41 character result into its output buffer.

The 41 byte result of the Logout Command is then read by client application 43. Client application 43 makes a page request to remote server 50 with this 41 byte sequence as a query string. Referring to FIG. 14, this request (301) is checked for validity (302) and then processed as a Login/Logout Request (306). Remote server 50 then replies with a web page response (308) to confirm the logout has been registered successfully. Remote server 50 updates Alpha Five Database user logs (pcm4logs) to record the logout time and the remaining time allowed for the current day. Referring to FIG. 12, client application 43, in response to the reply from remote server 50, returns back to the User Name Request (153) function to start the login screen (FIG. 10).

Power Off

Depending on the operating system settings of PC OS 35, the pulse on the Power+ signal to motherboard 1 will signal PC OS 35 that a shutdown or standby state is required. PC OS 35 handles the necessary operations for the operating system before it causes motherboard 1 to enter the standby or power off state. This process can take a significant amount of time (>30 seconds) depending on the state of PC OS 35 and running applications, however ultimately power to VGA 3 is shut off. There are conditions where PC OS 35 does not properly shut down such as waiting for the user to press a key to save data or if the user changed PC OS 35 settings so pulsing the Power+ signal does nothing.

Refer to FIG. 8, the flowchart for the software operation of microcontroller 4. The program running in microcontroller 4 checks to see if it is in the login state (108). If the device is not in the logged in state, microcontroller 4 counts how long VGA 3 is powered, and if it is on greater than 75 seconds (113) client application 43 generates an alert condition and sends two power off commands to microcontroller 2a at exactly 75 and 135 seconds (114) top again pulse the Power+ signal on motherboard 1. If this condition persists for more than 240 seconds (115), the program in microcontroller 4 sends a Power Off Hard Command to microcontroller 2a (116). The program in microcontroller 2a, in response to this command holds the Power+ signal down for 8 seconds thus causing motherboard 1 to signal power supply 12 to turn off regardless of the power button settings of PC OS 35.

PC OS 35 Initiated Power Off

When the user causes PC OS 35 to enter into standby, hibernation or power off through operating system feature selection (i.e. click the "Shut Down" button), PC OS 35 will prepare and then force the PC system into a state where power to VGA 3 is off. Referring again to FIGS. 8 and 12, this condition is sensed by the program running in microcontroller 4 (111) initiating a VGA power off alert condition (112) to client application 43 alert interrupt (195). When the alert condition is received, a status request command to microcontroller 4 is sent to identify the type of alert (195). The alert condition error message is then displayed, if appropriate (196). If the alert is detected during login (197), client application 43 proceeds to the logout function (184). Otherwise it proceeds to login screen (153).

Critical Alert Events

An alert condition can also result from some form of intrusion into computer case lid 20 or switching board cover lid 24a, excess vibration or power cycling of the system as detected by microcontroller 4. These are considered critical alerts because, in addition to requiring a logout, the condition must be stored in Flash program memory within microcontroller 4 and thus prevent any future logins from users other than user 8.

Computer case lid 20 and switching board cover 24a alerts can be detected at any time, even when microcontroller 4 is in a sleep state (i.e. when SBC 5 does not have power). When a critical alert condition is identified by the program in microcontroller 4 while the system is powered, the program in microcontroller 4 sends microcontroller 2a the Hard Power Off command. If the intrusion is detected when SBC 5 is powered and client application 43 is at login screen (153), microcontroller 4, referring to FIG. 8, will detect the alert condition (106), store the alert condition in Flash program memory (107) raise the GPIO4 signal to SBC 5. This, referring to FIG. 12, causes an alert interrupt which results in the alert interrupt function (195) being called. The alert interrupt function identifies the alert condition by reading the device status of microcontroller 4 and results in the appropriate error message displayed in a message dialog box (196). Once an alert is detected, login screen 153 will only display or allow logins to user 8 until the alert condition is cleared by a login to user 8. This also enforced by the program in microcontroller 4.

Operation of Power and Reset Switches

A user logout can also be initiated by the depression of reset switch 14 or power switch 15 on front panel 21a under certain conditions. When the one of these keys are detected by client application 43, the application decides what operations must be completed and decides whether or not to log out the system. Switch detection functions of client application 43 use standard GPIO functions provided by Python interpreter 42 and device libraries 41 running on Linux OS 40. When reset switch 14 is pressed, the reset switch detect interrupt function is called (190). This function de-bounces and times the key press. When the key has been pressed for at least 4 seconds or the key has been released, the process reset switch function (191) is called. When power switch 15 is pressed, the power switch detect interrupt function is called (192). This function de-bounces and times the key press. When the key has been pressed for at least 4 seconds or the key has been released, the process power switch function (193) is called.

Refer to the following chart for the operations associated with these functions:

Process Reset Switch Function (191) Operation

| Switch | Hold Time | Logout | Function |
| --- | --- | --- | --- |
| Reset | <1 sec. | No | Reset PC CPU (motherboard 1) |
| Reset | >1 < 4 sec. | Yes | Logout, reset SBC 5, OS 40, Client Application 43 |
| Reset | >4 sec. | Yes | Logout, halt SBC 5, OS 40 (for removal of standby power) |

Process Power Switch Function (193) Operation

| Switch | Hold Time | Logout | Function |
| --- | --- | --- | --- |
| Power | <.5 sec. | Yes | Mode 1: Switch display to status screen for 5 secs. (display 18a) |
| Power | <.5 sec. | Yes | Mode 2-3 or pressed 2x Mode 1: Log out current user |
| Power | >.5 < 4 sec. | Yes | Mode 1/2 logs out current user/mode, attempts Mode 3 login |
| Power | >.5 < 4 sec. | Yes | Mode 3 logs out current user/mode, attempts prior Mode login |
| Power | >4 sec. | Yes | Hard power off PC (motherboard 1) |

Remote Server 50 PCM4B.A5 W Application

Refer to FIG. 14 for the flow chart of the operation of Alpha Five web page pcm4b.a5w. This page is part of the collection of pages published to remote server 50 and served by Alpha Five Application Server 51. It is written using Alpha Five Version 9, Platinum edition. The script on the page is written in xbasic, the native scripting language of Alpha Five.

The page, when accessed, initializes variables used on the page (300). The page is always requested with a query string variable "session.cr" equated to a 41 character web-safe ASCII code sequence. Some functions require additional query string variables. The last character of this code sequence defines the type of request. Upon receiving a request of this page, the variable session.cr from the query string is validated (302). The xbasic script program on pcm4.a5w evaluates the 41 character string for validity by checking various fields and authenticating the request with record lookups to Alpha Five database 53. It first checks to see if the request is one of the allowed requests by verifying the last character of the sequence is either an "r" for a Registration Request, "n" for a Name Request, or "0", "1", "2" or "3" for Login/Logout Request. Wrong characters, incorrect number of characters in the query string or missing information will result in a malformed request error and the script on the page replies with the error in text format and logs the error event by recording a record in table pcm4accesslogs (303).

Each request function has a 10 character confirmation code at locations 30-39 of the query string and is created as part of the reply (308). This is calculated as a checksum (in hex format) of all other fields in the request. The method of calculating this checksum matches the method used in microcontroller 4. If the checksum provided does not match the calculated value then the request is invalid and the page replies (303) with the error in text format and the script logs the error event by recording a record in table pcm4accesslogs.

If the request is determined to be valid, the program branches (304) to the appropriate routines-Registration Request (305), Login/Logout (306), and Name Request (307).

Registration Request Function (305)

Registration requests require two query string variables session.cr and session.em. Session.em is checked for validity as a valid email address.

session.cr=

| 0 | "0" - User number 0 (setup user) |
| --- | --- |
| 1-10 | Master User Password (right padded with ".") |
| 11-19 | Master User ID |
| 20-27 | 8 character registration code ASCII |
| 28-29 | "0" |
| 30-39 | 10 character confirmation code |
| 40 | "r" | session.em=
account master email address

The registration request function (305) begins by checking the registration information provided through the page request by SBC 5 to confirm that the device is not already registered or the ID is not already in use by another user. If a user attempts to register a system with an ID that is already used, the program will check to see if the ID, password and email address all match. If so, the registration request (305) will be allowed and will share the same ID, password and primary email address.

If one or more error conditions are identified, an error message is sent as the response (308). The error message is reported by client application 43 and the user is prompted to try again or contact customer service, depending on the error reported.

If the registration request is valid, the program running on remote server 50 creates a record entry in table pcm4. Table pcm4 contains the records of all account holders with fields containing authentication entries such as the account ID, password and email address. The script also creates a file directory for the account and places two Alpha Five Database 53 tables "pcm4times" and "pcm4alerts" into that directory. Table pcm4times includes database records for time limit settings for individual users of the account (i.e.

default user, Admin user 8). After setting up the account for the registering system, the following 41 character sequence is composed and sent as part of the reply (308) in the form of:
"<BR>Response:"
Followed by the following 41 character sequence:

| | |
|---|---|
| 0-9 | Assigned Account ID (10 digit ASCII) |
| 10-19 | Master User ID (10) padded with "." |
| 20-29 | Master User Password padded with "." |
| 30-39 | Confirmation Code (10) |
| 40 | "R" |

Name Request Function (307)
Name requests require the query string variable session.cr:
session.cr=

| | |
|---|---|
| 0-9 | Master User ID |
| 10-27 | "0" |
| 28-29 | 2 digit ASCII representation of 8 bit Device Status Code of microcontroller 4 |
| 30-39 | 10 character confirmation code |
| 40 | "n" |

Upon receiving a valid name request, the Name Request function (307) of script pcm4.a5w performs a record lookup in table pcm4 to identify the internal account associated with the supplied Master User ID. If an account is found, the function checks to see if the account is linked to a master account. The function assembles a list of names and associated user numbers from the records of table pcm4times within the directory of the matched account or master account, if linked. After assembling this information, the function replies with an html page containing the list of numbered names for the enabled users in the following format:
"Name Request Ok:<BR>1. name1<BR>2. name 2<BR> . . . users 3-7<BR>8. Admin User <BR><BR>Message:"
where name1 is the name of the first user ("Default" is the default name for user 1). Note that the list is delimited with "Name Request Ok:" at the start of the list and "<BR><BR>Message:" at the end.
Login/Logout Request (306)
Login or Logout requests require the query string variables
session.cr:|
session.cr=

| | |
|---|---|
| 0 | User Number (ASCII) "0"=setup, "1"-"8"users |
| 1-10 | Password 10 character password (entered password), password fail= all blank |
| 11-20 | Master User ID for Prelogin Request |
| 21 | Logout Request - not used |
| 21 | Login Request "0" password failed, "1" password success |
| 22-27 | "0" |
| 28-29 | 2 digit ASCII representation of Device status Code value in hex |
| 30-39 | 10 digit confirmation code (ASCII) |
| 40 | Login Request type "0" = logout, "1" = Gaming mode, "2" = Study, "3" = No Video mode |

When a valid request is received, the Login/Logout Request function (306) is called and performs a record lookup in master table pcm4 to identify the internal account associated with the supplied Master User ID. If an account is found, it is first checked to see if the account is linked to a master account. Then the supplied Password is verified against the password field of the pcm4times table in the account directory of the matched or master account, if linked. If this does not match, the function replies (308) with an error indicating the password failure and does not further process the login request. If a valid account is not found, then the function replies with an error response (308) indicating no account has been found.

If a valid, enabled account with a correct password entry is found, the program branches to process either the Login or Logout request. If a valid request is received for a valid account, the program then determines the local time and date for the account by adjusting the time and date values provided to application script pcm4.a5w by Alpha Five Application Server 51 running on remote server 50 according to the time zone and Day Light Saving Time settings stored in the account record of table pcm4. This adjusted time and date will be used for login and logout calculations and for entries in table pcm4logs. Although the first embodiment uses the Day Light Saving time schedule for the United States, the program script on pcm4.a5w can be changed for remote server 50 serving countries with a different schedule.
Login The last record of table pcm4logs with the matching account number (system), within the directory of the matched or master account (if linked), is read to determine if there is a current login or if the logout for the last login was never recorded. A logout may not have been recorded if the system loses AC mains (power failure, unplugged system or turned off at power strip) or something disrupts the internet or network (i.e. Wi-Fi) service prior to a proper logout. In either case the function now records a logout marking either the current time or the expected time if the expected time for logout has since past. Current day (or past day) time use and estimated balances are calculated and recorded as part of the pcm4logs record.

Once there are no prior open login pcm4logs records, the program then evaluates if the current login request is allowed at this time and by this user. The program loads the pcm4times record for the user requesting the login. If the account (system) is linked to a master account, table pcm4times from the master account is used instead. The record is used to make the following evaluation:

1. Is the user enabled? If not, then do not login and reply (308) with the appropriate message.
2. Is the current date on or after disable start date and before the re-enable date? If so, do not login and reply with the appropriate message.
3. Is the current date on or after the Holiday Start Date and on or before Holiday End Date? If so usage limit values are taken from the Holiday day settings. Otherwise, use the settings for the current day of week.
4. Based on prior logins (from table pcm4logs) for the current date by this user, is the time already used for this login type less than the amount allowed in the current day of week settings (or Holiday)? If yes, time is allowed and the amount allowed in seconds is the Remaining Time. If no, then no time is allowed for the current login unless authorized by Bonus Time.
5. Is the current time after the Start Time and before the End Time for the current day of week settings (or Holiday)? If not, no time will be authorized for this user and mode unless authorized by bonus time. If so, calculate the number of seconds from the current time to the end time. This is the Remaining Range Time.
6. The current time after the start of the Lockout Start time and before the Lockout End time settings for the current day of the week settings (or Holiday)? If so not time is available now unless authorized by Bonus time.
7. Is the current time before the Lockout Start time for the current day of the week settings (or Holiday)? If so, calculate the amount of time available between the current time and the Lockout Start time. If this time is less then Remaining Time Range, then replace Remaining Time Range with this value. Otherwise, do not change Remaining Time Range.
8. If no time is available from Remaining Time or Remaining Time Range, does the current date match that of the Bonus Date field AND does the Bonus Time field evaluate to a non-zero value (both fields from the user's record of pcm4times). If this condition is met, then Login Remaining Time is set to the value in the Bonus Time field (in seconds).
9. If time is available from both Remaining Time and Remaining Time Range, which is smaller? The smaller of the values is the Login Remaining Time.

If no time is authorized, the function replies with page content response (308) indicating that no time is authorized. If the Login Remaining Time is non-zero then the login is authorized and the application adds a login record into table pcm4logs from the matched account or master account (if linked) with the following fields:
Customerid=Assigned Account Number
Username=Name of user logging in
Userid=Id of user logging in
login=adjusted local login time/date
logintype=mode type (1-3)
total=Login Remaining Time
dailysum=total accumulated time used on the current date
IPaddress=the Internet IP address of the caller (Cable modem address)
Port=4 character port address assigned The function further replies (308) with the following information on the page:
"<BR>Response:" . . . 41 character sequence . . . "<BR>" 41 character sequence:

```
 0    User Number (ASCII) "1"-"8"
 1-10 Password 10 character password entered
11-24 Login Time/Date in Sorted ASCII Equivalent from Server
      11, 12, 13, 14 - Year in ASCII
      15, 16 - Month in ASCII
      17, 18 - Day of Month in ASCII
      19, 20 - Hour in 24 hour ASCII format
      21, 22 - Minutes in ASCII
      23, 24 - Seconds in ASCII
25-29 Login Remaining Time to next time limit (in second increments,
      in ASCII decimal leading zero)
30-39 10 digit confirmation code (ASCII) Prelogin or Logout Requests
      only
 40   Login Mode type "1" = game mode, "2" = study, "3" = screen off
```

Followed by . . .
"<BR>port=" pppp "<BR>"
Where pppp is the 4 character port address (for port forwarding) assigned for this login. It is assigned starting at 8000 however will increment automatically to avoid port numbers at the same remote IP address already in use by current logins.

Logout

When the request is a logout type, the function reads the last record of table pcm4logs, within the directory of the matched account or master account (if linked), to determine if there is a current login. A current login is defined as a record where there is a login time/date but the logout time/date for that record is blank. If there is no current login, the function replies (308) with an error message indicating the error. If there is a current login record but the user number or login type for the current logout request does not match the current login, the function replies (308) with an error message indicating the error.

If the logout request is determined to be valid, the function then updates the following fields in the pcm4logs record:
logout=current adjusted logout time
dailysum=total time used on the current date
IPaddress=the Internet IP address of the caller (Cable modem address) at logout The function replies (308) with a message indicating the logout was a success.

Remote Server 50 Browser-based Web Application

Alpha Five web pages allow web browser and mobile application-based access to the content of Alpha Five database 53. This allows for configuration of account profiles and user limit settings by account holders for each system and by the system administrator managing Alpha Five database 53 and remote server 50. In order to access the content of Alpha Five database 53, the user must first be authenticated. Referring to FIG. 7, this is accomplished through the login page pcm4login.a5w (61) containing xbasic script and an Alpha File dialog component with fields to allow entry of an ID and password. The user enters this information and enters the submit button on the page. The program (xbasic script) running on page pcm4login (61) accesses Alpha Five database 53 table pcm4 and attempts to find a matching record entry. If a valid record is matched, a field in the record identifies the security privilege level of the user attempting to log in (63). If no valid record is matched, an error is returned on the page.

In this first embodiment there are two types of privilege levels of users authorized:
Account Holder—This is the owner of an individual system or linked systems with privileges to change all settings, passwords and add or delete users (for their account only).
System Administrator—Allows full access to all accounts and specialized administrative tools within Remote Server 50. These tools include backup schedules, mass email capability, account enable/disable and un-register enable.

System Administrator Login

If the privilege level is that of the system administrator, the program loads page pcm4admin.a5w (69). This page allows the system administrator to perform global system administrative functions such as changing system passwords, server settings and batch control functions. This page also has a link to web page selectaccount.a5w (with administrator privileges) which allows the system administrator to selecting any user account (70). After selecting a user account, the page will redirect to pcm4main.a5w (63) with system administrator privilege level. The higher privilege level allows access to additional fields in the account records that the account holder cannot access. Additional fields available to the system administrator include account enable/disable, password reset, un-registration, and subscription and account service level settings. The system administrator has 100% control over all user account settings. Security privilege levels and access to fields based on security level is a standard capability of the Alpha Five database management system.

Account Holder Log In

If the user logging in is a valid account holder, the script on this page forwards the user to pcm4main.a5w (63) with account holder privilege level. Note that only page pcm4login.a5w can be accessed without authentication. Accesses to any other page when not properly "logged in" will result in the page immediately forwarded to login page pcm4login.a5w (61). If there is more than one account (systems) with the same master user ID and password, then multiple accounts will be available with selection options at the bottom of the screen. This will allow the account holder to select which system account to view and edit.

pcm4main.a5w (63)

This page has a status field at the top of the screen displaying the current login status of this system. It also has linked component tabs to allow configuration of various aspects of the account. The tabs on this page are:

Account Profile—This page allows for the setting of the master profile settings for the account. These include:

1. Login password. An "update linked accounts" checkbox option (default on) will force all accounts with the same ID, current password and email address to have their password updated to the new password.
2. Time Zone with Daylight Saving Time (DST) setting
3. Name, address, phone number, email address for alert and account messages
4. Master Account. This dropdown box with a list of names of accounts (systems) allows the user to select a "master" account, if desired. The list will include all accounts with the same ID, password and email address. When a master account is selected, the allowed users and limit setting values are used from the master account for this system. This allows all the same users and user settings to apply across multiple systems.

User Limits—This page displays the usage time limit settings for each user, for each login mode type for each day of the week and a "holiday" type. Here are the limit settings for each day of the week:

1. Manual Daily Enable—when enabled requires a separate access to the account configuration system to allow the user to log in.
2. Gaming Mode Start time, end time, allowed hours/minutes per day
3. Study Mode Start time, end time, allowed hours/minutes per day
4. No Video Mode Start time, end time, allowed hours/minutes per day
5. Lockout start time, end time One of the options that can be selected when editing user limit settings is "Force Update to Current Login". If this option is selected when submitting update values, the usage log table pcm4logs of Alpha Five database 53, for the account that is associated with the current web login, is checked to see if there is a current login for a user with limit settings that have just been changed. If not, then this option is ignored. If there is a current login with updated settings, the program on this page will perform a login update "push" to force an updated login to the system based on the new settings. This is accomplished by calculating appropriate values for the query string and making a "push request" (an http page request with the query string) to the IP and port address recorded for the current user's login from table pcm4logs.

These are the following steps in the program:

1. The program first determines the local time and date for the account by adjusting the time and date values for the account according to the time zone and Day Light Saving Time settings stored in the account record of master table pcm4. This adjusted time and date will be used for login/logout calculations and for entries in table pcm4logs. Although the first embodiment uses the Day Light Saving time schedule for the United States, the program can be changed for remote server 50 serving countries with a different schedule.

2. The program then evaluates if a login is allowed at this time for this user and how much time, if any is allowed. To accomplish this, the program loads the pcm4times record for the user and makes the following evaluation:

a. Is the user currently enabled? If not, then Login Remaining Time is 120 seconds (2 minute minimum value for login updates, same as forced log off), evaluation complete.

b. Is the current date on or after the disable start date and before the re-enable date? If so, then Login Remaining Time is 120 seconds, evaluation complete.

c. Is the current date on or after the Holiday Start Date and on or before Holiday End Date? If so usage limit values are taken from the Holiday day settings. Otherwise use the settings for the current day of week.

d. Based on prior logins (from table pcm4logs) for the current date by this user, is the time already used for this login type less than the amount allowed in the current day of week settings (or Holiday)? If yes, time is allowed and the amount allowed in seconds is the Remaining Time. If no, then no time is allowed for the current login unless authorized by Bonus Time.

e. Is the current time after the Start Time and before the End Time for the current day of week settings (or Holiday)? If not, no time will be authorized for this user and mode unless authorized by bonus time. If so, calculate the number of seconds from the current time to the end time. This is the Remaining Range Time.

f. The current time after the start of the Lockout Start time and before the Lockout End time settings for the current day of the week settings (or Holiday)? If so no time is available now unless authorized by Bonus time.

g. Is the current time before the Lockout Start time for the current day of the week settings (or Holiday)? If so, calculate the amount of time available between the current time and the Lockout Start time. If this time is less then Remaining Time Range, then replace Remaining Time Range with this value. Otherwise, do not change Remaining Time Range.

h. If no time is available from Remaining Time or Remaining Time Range, does the current date match that of the Bonus Date field AND does the Bonus Time field evaluate to a non-zero value (both fields from the user's record of pcm4times). If this condition is met, then Login Remaining Time is set to the value in the Bonus Time field (in seconds).

i. If time is available from both Remaining Time and Remaining Time Range, which is smaller? The smaller of the values is the Login Remaining Time.

j. If Login Remaining Time is less than 120 seconds, then Login Remaining Time is set to 120 (seconds).

3. The query string for the push to SBC 5 is constructed as follows:

"?loginupdate=" plus the following 41 character sequence:

---

0  User Number (ASCII) "1"-"8"
1-10 Password 10 character password for that user -continued

| | |
|---|---|
| 11-24 | Login Time/Date in Sorted ASCII Equivalent from Server |
| | 11, 12, 13, 14 - Year in ASCII |
| | 15, 16 - Month in ASCII |
| | 17, 18 - Day of Month in ASCII |
| | 19, 20 - Hour in 24 hour ASCII format |
| | 21, 22 - Minutes in ASCII |
| | 23, 24 - Seconds in ASCII |
| 25-29 | Login Remaining Time (in second increments, in ASCII decimal leading zero) |
| 30-39 | 10 digit confirmation code (ASCII) |
| 40 | Login Mode type "1" = game mode, "2" = study, "3" = screen off |

The 10 digit confirmation code is generated using the same algorithm as the Alpha Five Application Program pcm4b.a5w and microcontroller 4. The program sends the push request (Alpha Five http_get( ) function) with the constructed query string to the IP address and port of the current login as follows:

http://xxx.xxx.xxx:pppp/
    loginupdate.html?loginupdate=value where value is the 41 character sting constructed in the prior step and xxx.xxx.xxx is the IP address and pppp is the port address of the current login.

If the reply from SBC 5 returns with confirmation of success, then the program now records a logout with the adjusted current time. Current day (or past day) time use and estimated balances are calculated and recorded as part of the pcm4logs record. Success from SBC 5 indicates client application 43 received the update request and was able to successfully process the new login request to microcontroller 4 and update all its values. The program then adds a login record into table pcm4logs with entries on the following fields:

Customerid=Assigned Account Number
Username=Name of user logging in
Userid=Id of user logging in
login=adjusted local login time/date
logintype=mode type (1-3)
total=Login Remaining Time
dailysum=total accumulated time used on the current date
IPaddress=the IP address of the prior entry in pcm4logs
Port=port address of the prior entry in pcm4logs If the reply returns an error, an error is reported to the account holder on the page indicating that the values were updated however the successful update to the system was not.

User Profile—This page allows the creation, deletion, renaming and renumbering of users. For each user there are the following settings that can be changed:

1. User name
2. User number
3. Enable/disable
4. User disable start date, re-enable date
5. User Holiday start date, end date
6. User Allowance enable, allowance day of week, weekly allowance amount
7. Taper down allowed usage amount start date, taper amount (secs/day) and maximum taper amount
8. Email notification contact information In addition to the 7 days of the week—Monday, Tuesday, Wednesday, Thursday, Friday, Saturday, and Sunday, the system allows for settings for an extra day called Holiday. This day generally has relaxed limits however any limits can be set for this day. When either a global holiday date is set in the Account Profile OR set in the individual's User Profile AND the current date is within the range of the date set, remote server 50 (157) will use the Holiday settings instead of the normal day of the week settings when processing server login requests to pcm4.a5w xxx.

User Alerts—This page displays the alerts generated by the system (i.e. cover open) with the time, date, type of alert and if the alert was cleared, when and by whom.

User Logs—This page displays the user logins and logouts by user number, login type, login and logout time/dates and usage amounts. These can be edited or deleted.

System Administrator Login

The Alpha Five web page, pcm4admin.a5w (70), is only available to the System Administrator and provides a menu of configuration options for the entire system. These options include setting the global time zone of the server and enable and configure daily batch processes (i.e. start time) which perform important housekeeping functions. These functions include database backup, archiving and compressing the database, sending/receiving email messages and uploading files and software updates. In addition, it allows for the selection of a user account. If a user account is selected, the page will forward to pcm4main.a5w with the client account selected and with a higher security level and access to database record fields unavailable to account holders.

Description and Operation of Other Embodiments

Level of Integration

This first embodiment uses a combination of a modified standard Mini-ITX motherboard 1 and several circuit boards. Once skilled in the art could see how the functions of Mod Board 2, VGA 3, Main Switching Board 22*a* and Aux Switching Board 22*b*, and SBC 5 could be integrated together on a single custom motherboard or on a motherboard and one or more additional circuit boards.

Additional Display Types

Although the first embodiment shows external displays with HDMI and/or DVI inputs, one skilled in the art could see how other input types, such as Display Port, could be used. This would require VGA 3 having that type of video output, the appropriate connections from VGA 3 to video switch 6*a* and dual video switch 6*b*, and changes to connectors 8*a*, 8*b*, and 8*c* to match the type of video output. One skilled in the art could also see how additional video switch circuits could be added to support more than 3 displays All in One or Laptop Systems Note that although the first embodiment shows external displays, one skilled in the art could see how one or more of these displays could be included within the enclosure of the Personal Computer system itself. These displays could be LCD or LED types and connect to an integrated video graphics adapter through the same type of video signals (i.e. HDMI or DVI). Thus video switch 6*a* could retain the same design. Alternatively, these signals could be of a different type, perhaps even directly controlling the LCD or LED panel's pixels. These signals can still be switched through high speed switching logic to provide the same functionality. Further, one skilled in the art could see how, with additional integration, the functions of this system could be integrated into a laptop or otherwise portable computer system.

Front Panel Status Display Screen

Although the first embodiment does not include an integrated screen continually displaying status, it is anticipated that a small Liquid Crystal Display (LCD) or Light Emitting Diode (LED) display could be added to the system and included on the outside of the system enclosure (i.e. front panel) to display current status, product/company logo or even login prompts. One skilled in the art could see how such a device could easily be connected through I2C to SBC 5 and client application 43 easily changed to output ongoing status to this display.

Smartphone Integration

While the display and keyboard of the system are used to log into the system, one skilled in the art could see how applications (apps) running on smart cell phones (running Android or IOS) could manage this process. The apps could provide a login screen and through a Wi-Fi or Bluetooth connection to SBC 5, could provide the "display" and "keyboard" components to allow authentication. This could be added for convenience using the current architecture or could be used exclusively to allow lower cost Single Board Computers that do not have video output signals or USB keyboard support. If microcontroller 4 supported Wi-Fi or Bluetooth directly, one skilled in the art could see how program changes to microcontroller 4 could result in the elimination of a separate SBC altogether.

Still and Video Image Screen Capture

Although not in this first embodiment, it is anticipated that with additional standard software programs installed on Linux OS 40 and changes to client application 43, periodic screen images can be created and made available remotely to authorized users on the same network (or over the internet when the local router is configured with port forwarding). This feature provides accountability for users of the system allowing parents or significant others the ability to remotely monitor screen activity at will. One skilled in the art can see that if a program such Scrot was installed on Linus OS 40 and initiated by client application 43 while a user is logged into the system, the program can be configured to capture screen images and save the image files to a password protected file area available to nginx server 45. Nginx server 45 can be configured to deliver these files to other web enabled devices when the files are requested and the proper remote authentication (through server side scripts running on SBC 5) is entered by the remote user.

Local Time Limit Settings

This first embodiment includes remote server 50 running in a data center in a remote location and accessible through the internet. One skilled in the art could see how these same functions for a single system, or multiple systems linked to the same account, could be running on a local computer system (on the same local area network). This local computer could be a dedicated computer system acting as a web server running Alpha Five database 53. Alternatively, SBC 5 could provide these functions. One skilled in the art could see how with the installation of SQLite on Linux OS 40, changes to the configuration of nginx web server 47, and changes to client application 43 could easily allow both local and remote (through port forwarding) access to the limit settings of the system without requiring separate remote server 50.

Use with Dedicated Gaming Systems

This first embodiment does not directly support limiting use of external, dedicated video game consoles such as Xbox® that are located in the same home. One skilled in the art could see how this could be incorporated as a feature of this system. One of the demonstrated features of the upcoming Windows® 10 operating system is the ability to stream the video game content of Xbox video game consoles on the same network in real time with low latency. This allows the Windows® 10 system to be used as a virtual video game console playing games actually running on the native Xbox® console. The Windows 10 system displays the screen, plays the sound and provides the controllers to operate the game play. One skilled in the art could see how, if the Xbox® system is locked through some device or in some form of enclosure (or the parent's closet) that prevented access to its video output, the system described in this document running Windows 10 could be used to limit use of Xbox video game consoles. This is important as the parental control capabilities of these devices are limited and some game titles are only available on these consoles. Further, it is anticipated that many users of this system may already own an Xbox® system. As other gaming consoles support streaming to Windows® 10, these systems also be limited by this system.

We claim:

1. A computer system comprising:

a main processor;

a main memory coupled to said main processor adapted for storing a main operating system and installed applications, said main processor adapted for executing said installed applications;

a first video graphics adapter circuit coupled to said main processor;

a main system logic coupled to said main processor and said main memory;

a power supply coupled to said main system logic and configured to operate in one of a plurality of states, signaled by said main system logic, wherein if the said power supply is signaled to operate in an on state, said power supply provides power to said main processor and said video graphics adapter circuit and if the said power supply is signaled to operate in an off state, said power supply does not supply power to said main processor and said video graphics adapter circuit;

a plurality of front panel connector circuits coupled to said main system logic;

a power switch input sensing means coupled to said plurality of front panel connector circuits so that upon detection of a power switch closure, said power switch input sensing means adapted to signal said main system logic to signal said power supply to switch states;

a microcontroller coupled to said plurality of front panel connector circuits and said power supply;

a user input means coupled to said microcontroller adapted to indicate the user is requesting to power said main processor to an on state to operate said main operating system;

a memory coupled to said microcontroller which is adapted for executing a program stored in said memory that upon detecting said user input determines, based on a date said user input is detected and a set of limitations values, if such a request is allowed or denied, and if said request is allowed, will cause said power supply to switch to said on state, and when an allowed time has elapsed, will cause said power supply to switch to said off state;

wherein said set of limitations values further comprise a plurality of taper down settings;

wherein said program determines the allowed time, smaller than a previous allowed time corresponding to a previous date, based on said taper down settings and said date of the user's request to power on said main processor;

whereby the allowed time is automatically reduced over time according to a predetermined schedule;

whereby forming a computer usage time limit system adapted to enforce computer usage time limits are enforced independent of the main operating system or installed applications.

2. The computer system of claim 1, wherein said user input means comprising a keyboard.

3. The computer system of claim 1, further comprising:
a USB host interface adapter coupled to said main system logic capable of interfacing to a USB keyboard;
a USB interface circuit coupled to said microcontroller; and
a USB switching circuit coupled to said USB interface circuit, said USB host interface adapter and said microcontroller with said program capable of switching said USB keyboard to either the USB interface circuit or said USB host interface adapter, whereby the USB keyboard can be used as said user input means and with said main operating system.

4. The computer system of claim 1, further comprising:
a network interface circuit coupled to said microcontroller;
a network coupled to said network interface circuit; and
a server computer containing a limitations database communicating with said program through said network providing the data for said set of limitation values.

5. The computer system of claim 4, further comprising a single board computer coupled to a network adapter, said network interface circuit comprises said single board computer and said network adapter.

6. The computer system of claim 1, further comprising:
a second video graphics adapter circuit coupled to said microcontroller; and
a video switching circuit coupled to said microcontroller, said second video graphics adapter and video graphics adapter with said program adapted for switching the output of said video switching circuit between said video graphics adapter and said second video graphics adapter.

7. The computer system of claim 6, further comprising a single board computer with video graphics output and said second video graphics adapter comprising said single board computer.

8. The computer system of claim 1, said plurality of front panel connector circuits comprising a microcontroller.

9. The computer system of claim 1, further comprising:
a non-volatile memory coupled to said microcontroller, and a system enclosure housing with a plurality of case covers, and a case cover open detect means coupled to said microcontroller such that if it is detected that a case cover has been removed, said program causes an alert state flag to be stored in said non-volatile memory, and will not signal said power supply to switch to the on state upon said program detecting said user input request to power the system.

10. The computer system of claim 9, further comprising:
a power supply state detect means coupled to said power supply and said microcontroller, that upon signaling said power supply is in the on state while said alert flag is set in said non-volatile memory, said program will cause said microcontroller to signal said power supply to switch to the off state.

11. The computer system of claim 1, said plurality of taper down settings include a start date, a number of seconds per day to reduce the allowed time, and a maximum number of seconds to reduce the allowed time;
whereby the allowed time is incrementally reduced by the number of seconds per day each day that elapses after the start date until the allowed time is reduced by the maximum number of seconds.

12. A computer system, comprising:
a main processor;
a main memory coupled to said main processor;
a video graphics adapter coupled to said main processor;
a main system logic coupled to said main processor and said main memory and a plurality of peripheral device controllers;
a power supply coupled to said main system logic and configured to operate in one of a plurality of states, signaled by said main system logic,
wherein if the power supply is signaled to operate in an on state, the power supply provides power to said main processor and said video graphics adapter, and if the power supply is signaled to operate in an off state, the power supply does not supply power to said main processor and said video graphics adapter;
a plurality of front panel connector circuits coupled to said main system logic;
power switch input sensing means coupled to said plurality of front panel connector circuits that upon detection of a switch closure will signal said main system logic to signal said power supply to switch states;
reset switch input sensing means coupled to said plurality of front panel connector circuits such that upon detection of a switch closure said reset switch input sensing means is adapted to signal said main system logic to signal a master reset of said main processor;
secondary processor means coupled to said front panel connector circuits and coupled to said power switch input sensing means such that it can emulate a power switch depression, and coupled to said reset switch input sensing means such that it can emulate a reset switch depression;
power sensing means coupled to said secondary processor and to said front panel connector circuits, said power sensing means adapted to determine if said power supply state is on or off; and
secondary memory means coupled to said secondary processor means, said secondary processor means adapted for executing a program in the secondary memory means for determining if the power supply state should be on or off, and in response to the power supply being detected as on when determined it should be off, causes the said secondary processor means to emulate a power switch depression to cause the power supply to switch to the off state;
wherein said program further determines if said power supply state remains on even after said secondary processor means emulated a power switch depression, and if such a determination is made, causes a periodic emulation of the reset switch to cause said main processor to continually reset;
whereby rendering said main processor unusable.

13. The computer system of claim 12, further comprising a secondary input/output means coupled to said secondary processor adapted for receiving data communication from an external device and said program executing in said secondary memory interprets such data communication to determine if said secondary processor means should emulate a power switch depression or not.

14. The computer system of claim 12, said plurality of front panel connector circuits further comprising a microcontroller.

15. A computer system that operates in a plurality of modes such that in one mode a refresh rate of a video content to be displayed is reduced, and in another mode said refresh rate of said video content to be displayed is not reduced, comprising:
- a main processor;
- a main memory coupled to said main processor;
- a primary operating system adapted to be loaded in said main memory and adapted to be executed by said main processor;
- a video graphics adapter containing a frame buffer, coupled to said main processor;
- a reduction means coupled to said video graphics adapter adapted for reducing a video content output rate from said video graphics adapter, and selection means coupled to said reduction means adapted to select any of a plurality of modes; and
- a video display signal output means coupled to said reduction means adapted for outputting signals to drive a video display;
- whereby the ability to play video games and/or watch video media content is limited;
- wherein said reduction means comprises:
- a second processor;
- a second memory coupled to said second processor which said second memory is adapted for storing a second operating system and application programs adapted to be run by said second processor;
- a second video graphics adapter coupled to said second processor;
- a networking means coupled to said main processor;
- a second networking means coupled to said second processor;
- a local area network means which is adapted to be coupled to said networking means and said second networking means such that both said networking means and said second networking means are adapted to communicate with each other;
- a virtual networking computing server application running on said primary operating system configured to allow remote desktop connections;
- a virtual networking computing client application, running on said second operating system, configured to communicate with said virtual networking computing server application to provide a remote desktop display output by said second video graphics adapter; and
- a video signal switching circuit coupled to said selection means and said video display signal output means to switch said video signal output from either said video graphics adapter or said second video graphics adapter to said video display signal output means.

* * * * *